United States Patent
Ahmed et al.

(10) Patent No.: US 10,829,913 B1
(45) Date of Patent: Nov. 10, 2020

(54) HYBRID POTABLE WATER GENERATOR

(71) Applicant: Prince Mohammad Bin Fahd University, Dhahran (SA)

(72) Inventors: Faizan Ahmed, Dhahran (SA); Nassim Khaled, Dhahran (SA)

(73) Assignee: Prince Mohammad Bin Fahd University, Dhahran (SA)

(*) Notice: Subject to any disclaimer, the term of this patent is extended or adjusted under 35 U.S.C. 154(b) by 0 days.

(21) Appl. No.: 16/992,538

(22) Filed: Aug. 13, 2020

(51) Int. Cl.
    *E03B 3/28* (2006.01)
    *C02F 1/04* (2006.01)
    (Continued)

(52) U.S. Cl.
    CPC .............. *E03B 3/28* (2013.01); *B01D 1/0035* (2013.01); *B01D 1/0041* (2013.01); *B01D 1/30* (2013.01);
    (Continued)

(58) Field of Classification Search
    CPC ...... B01D 1/0041; B01D 1/30; B01D 5/0035; B01D 5/0039; B01D 5/0054; B01D 5/006; B01D 5/0087; B01D 53/265; B01D 61/025; B01D 61/08; B01D 2311/2669; B01D 2311/2673; E03B 3/04; E03B 3/28; H02S 10/12; H02S 40/38; H02S 40/44; C02F 1/043; C02F 1/14; C02F 1/441;
    (Continued)

(56) References Cited

U.S. PATENT DOCUMENTS 10,207,935 B2  2/2019  Beitelmal et al.
2004/0244398 A1*  12/2004  Radermacher ............ E03B 3/28
                                           62/285

(Continued)

FOREIGN PATENT DOCUMENTS

CN        202968177 U    6/2013

OTHER PUBLICATIONS

Paul M. Cabacungan et al., "Solar-Powered Atmospheric Water Generation and Purification System", 4th International Conference on Humanoid, Nanotechnology, Information Technology, Communication and Control Environment, and Management, Mar. 2009, 6 pages.

(Continued)

*Primary Examiner* — Brian A McCaig
(74) *Attorney, Agent, or Firm* — Oblon, McClelland, Maier & Neustadt, L.L.P.

(57) ABSTRACT

A hybrid system for freshwater production utilizing the latent heat of condensation of atmospheric air humidity as a source of thermal energy to evaporate freshwater in a brine or saline and delivered to the saline evaporating chamber by a heat pump. Distillates form on both sides of the heat transfer, and intensification of humidity condensation in the air leads to the intensification of saline evaporation contributing to the overall increased yield of freshwater. The process is optimized by integrated systems in which the waste heat of inside and outside sources and the heat sink effect of the saline feed amplify the COP and SEER indexes of the installation. The technological regimes in which the equipment is used are intensified and optimized, cutting the desalination costs to the ranges affordable to the general population residing in arid regions in need of such technology.

9 Claims, 10 Drawing Sheets

(51) Int. Cl.
| | |
|---|---|
| C02F 1/14 | (2006.01) |
| C02F 1/44 | (2006.01) |
| B01D 1/00 | (2006.01) |
| B01D 1/30 | (2006.01) |
| B01D 5/00 | (2006.01) |
| B01D 53/26 | (2006.01) |
| B01D 61/02 | (2006.01) |
| B01D 61/08 | (2006.01) |
| H02S 10/12 | (2014.01) |
| H02S 40/38 | (2014.01) |
| H02S 40/44 | (2014.01) |
| E03B 3/04 | (2006.01) |
| C02F 103/08 | (2006.01) |

(52) U.S. Cl.
CPC ........... *B01D 5/006* (2013.01); *B01D 5/0039* (2013.01); *B01D 5/0054* (2013.01); *B01D 5/0087* (2013.01); *B01D 53/265* (2013.01); *B01D 61/025* (2013.01); *B01D 61/08* (2013.01); *C02F 1/043* (2013.01); *C02F 1/14* (2013.01); *C02F 1/441* (2013.01); *E03B 3/04* (2013.01); *H02S 10/12* (2014.12); *H02S 40/38* (2014.12); *H02S 40/44* (2014.12); *B01D 2311/2669* (2013.01); *B01D 2311/2673* (2013.01); *C02F 2103/08* (2013.01); *C02F 2201/002* (2013.01); *C02F 2201/009* (2013.01); *C02F 2209/42* (2013.01); *C02F 2303/10* (2013.01)

(58) Field of Classification Search
CPC ............ C02F 2103/08; C02F 2201/002; C02F 2201/009; C02F 2209/42
See application file for complete search history.

(56) References Cited

U.S. PATENT DOCUMENTS

| | | |
|---|---|---|
| 2008/0148744 A1 | 6/2008 | Al-Maaitah |
| 2010/0314238 A1 | 12/2010 | Frolov et al. |
| 2012/0085094 A1* | 4/2012 | Davis .................. B01D 61/027 60/641.8 |

OTHER PUBLICATIONS

Aditya Chauhan, et al., "Futuristic approach for thermal management in solar PV/thermal systems with possible applications", Energy Conversion and Management, vol. 163, May 1, 2018, pp. 314-354 (Abstract only).

* cited by examiner

Pump logic

If Water Level 3< minimum water height threshold
    Turn on pump
ElseIf Water Level 3> minimum water height threshold + Additional margin
    Turn off pump
End

Compressor logic

If (Water Level 1 + Water Level 2) <Threshold
    Turn on compressor
ElseIf (Water Level 1 + Water Level 2) >Threshold  + Additional Margin
    Turn off compressor
End

FIG. 7B

If (Relative Humidity Sensor H1> desired Relative Humidity H1) & (Compressor is ON)
    Open valve and route coolant towards primary cooling coil
    Turn on the fan
ElseIf (PV surface temperature T1> desired PV surface temperature T1) & (Compressor is ON) & (Lux sensor reading>Day time threshold)
    Open valve and route coolant towards secondary cooling coil
    End
    Turn off the fan
Else
    Turn off the fan
End

FIG. 7C

HYBRID POTABLE WATER GENERATOR

BACKGROUND

Technical Field

The subject of the invention is a device and method of potable water production from both saline water and atmosphere.

Description of the Related Art

Freshwater is a critical resource for many aspects of human life: direct consumption, food preparation, personal hygiene, agriculture, industry, fishery, etc. Despite dependence on freshwater, available water resources are often scarce, especially in the arid regions of the planet devoid of rivers, lakes, aquifers, and suffering low levels of atmospheric moisture.

The arid regions of the world occupy 26-35% of the Earth's land surface. This wide range reflects various definitions based on climatic conditions, vegetation types, or the potential for food production. Much of this land lies between 15° and 30° latitude. Aridity is measured by the aridity coefficient or the coefficient of desertification (See: Meigs, P. (1961) 'Map of arid zone', in L. D. Stamp (Editor) A History of Land Use in Arid Regions, UNESCO Arid Zone Research, Publication XVII, Paris, 388 p; UNCOD Secretariat (1977) Desertification: Its causes and consequences, Pergamon Press, 448 p).

The arid regions include the Arabian Peninsula, Sahel, Maghreb, Jordan, Central Asia, parts of Iran, Australia, Namibia, Chile, Peru, Argentina, California, Texas, Arizona. While lacking in water resources, the arid regions are abundant in solar energy, allowing the production of freshwater from saline water and the atmosphere. In all regions mentioned above, there is access to sea-coast where saline water and high humidity exist in combination with high annual solar luminosity.

This combination of conditions supports closed water cycles, reclaimed water, atmospheric water generation and desalination, that can be considered unlimited water resources. These artificial resources are potential solutions to the various water crises. These crises exist in the regions that are not arid per se but are overpopulated or suffer conflicts engendered by the need for water sharing.

Currently, the process efficiency is the determinant. An example is the IBTS Greenhouse which uses 0.45 kWh of energy for the production of 1.0 m³ of distilled water (See: Greenhouse Systems with Integrated Water Desalination for Arid areas based on Solar Energy by M. Thameur. Chaibi). Other determinants include the side effects of the technologies. The Integrated Biotectural System is an example for a low-tech solution, based on a natural wetland, without the use of toxic anti-sealants used in industrial desalination plants and without the discharge of brine into the source water body as is common in the desalination industry.

Desalination processes compete with natural water recovery and transportation by shipping/piping from other locations. The latter often entails arbitrary prices and the costs of transportation/pipeline building that make large-scale import of water unsuitable for the large scale needs of independent agriculture, industry, and urban development. Dependence on imports, distant delivery, complex infrastructure for such a crucial resource as water is undesired for most of the societies. A cheap local solution is a preferred alternative.

Natural water recovery (drilling, collection of water during rain season) may also be prohibitive in some cases. Energy consumption for seawater desalination is as low as 3 kWh/m³, including pre-filtering and ancillaries, similar to the energy consumption of other freshwater supplies transported over large distances, but much higher than local freshwater supplies that use 0.2 kWh/m³ or less (See: "Energy Efficient Reverse Osmosis Desalination Process", p. 343 Table 1, International Journal of Environmental Science and Development, Vol. 3, No. 4, August 2012; Wilkinson, Robert C. (March 2007) "Analysis of the Energy Intensity of Water Supplies for West Basin Municipal Water District" Archived Dec. 20, 2012, at the Wayback Machine, Table on p. 4; "U.S. Electricity Consumption for Water Supply & Treatment" Archived Jun. 17, 2013, at the Wayback Machine, pp. 1-4 Table 1-1, Electric Power Research Institute (EPRI) Water & Sustainability (Volume 4), 2000).

The leading process for desalination in terms of installed capacity and yearly growth is reverse osmosis (RO) (See: Fritzmann, C; Lowenberg, J; Wintgens, T; Melin, T (2007). "State-of-the-art of reverse osmosis desalination". Desalination. 216 (1-3): 1-76). Theoretical minimum energy consumption for seawater desalination of around 1 kWh/m³ has been determined, excluding prefiltering and intake/outfall pumping. Under 2 kWh/m³ has been achieved with reverse osmosis membrane technology, leaving limited scope for further energy reductions (See: Elimelech, Menachem (2012) "Seawater Desalination" Archived Feb. 23, 2014, at the Wayback Machine, p. 12 ff; Semiat, R. (2008). "Energy Issues in Desalination Processes". Environmental Science & Technology. 42 (22): 8193-201; "Optimizing Lower Energy Seawater Desalination", p. 6 FIG. 1.2, Stephen Dundorf at the IDA World Congress November 2009).

However, reverse osmosis requires higher capital costs and production or import of both semi-permeable membranes and modules. Reverse osmosis relies on high-pressure pumps, membrane antifoulants and preservatives. The membranes are polymers that interface with the produced water and leak the polymerization catalysts and other additives. The membranes are fragile, subject to ageing, perforations, erosion, leaks, fouling, and concentration polarization. The filtrates require the additional post-processing by absorbents. While reverse osmosis is a reasonable alternative under the condition of home-grown membrane production, low-tech methods are preferable. The abundance of solar energy and extensive ocean/sea shore-line in the Arabian Peninsula, Sahel, Maghreb and Egypt, as well as availability of the Dead Sea shore in Jordan negate the issue of energy cost per a cubic meter of water and emphasize low capital costs and low technical requirements for solar-based solutions.

At the upper reaches of the atmosphere, the energy density of solar radiation is approximately 1,368 W/m² (watts per square meter). At the Earth's surface, the energy density is reduced to approximately 1,000 W/m² for a surface perpendicular to the sun's rays at sea level on a clear day. A solar installation with 10 m² of exposure and 20% of photon conversion yields $1.6 \times 10^9$ joules of electric energy per year, considering the night-time and variable angles of illumination. This significant resource can be leveraged in heat-pump schemes reaching the efficiencies exceeding reverse osmosis.

The productivity of the installation can be even higher in hybrid regimes. In one aspect, the term "hybrid" is defined by the transfer of the full amount of solar energy to a circulating heat carrier. This full amount of solar energy consists of mechanical work of compressor, driven by a fraction of the electric output of the solar cell plus the heat absorbed by the expanded heat carrier from the photovoltaic cell. This heat forms due to recombination of the electrons and holes (exciton collapse) induced in the p-n junction of the solar cell by the incident light. Instead of becoming a potential difference on the photovoltaic electrodes, 80% of the excitons relax the photonic energy as heat. Since both thermal and mechanical components of the absorbed solar energy combine in the heat cycle of the refrigerant circulating through the system, this defines the first aspect of being a hybrid system.

The second aspect of the term "hybrid" is the extraction of potable water from two cooperating sources: seawater and humid air (e.g., extraction of moisture from air). The heat delivered to the saltwater includes not only the components absorbed from the photovoltaic cell but also the latent heat of air-born humidity condensation. Cooling the refrigerant flow returns the entire solar energy component in the cycle (except for the thermodynamically inevitable Carnot losses). Because both the condensation of the atmospheric humidity and the evaporation of the seawater produce portions of the potable water, the productivity yield per unit of solar energy is high. The increase in the airflow allows condensation of more air humidity and evaporation of more of seawater. Likewise, the increase in the flow of seawater allows cooling of more of the compressed hot refrigerant to bring it to a lower temperature. Correspondingly, post-expansion (a typical step in a refrigeration cycle) this refrigerant can absorb more heat from atmospheric humidity. Both components function in a state of positive feedback.

The third aspect of the term "hybrid" is the synergy between solar energy and numerous sources of low-quality heat: waste heat within and outside of the process, as well as passive heat of the environment.

Primarily, such a hybrid system uses almost the entire quantity of the absorbed solar energy (minus the waste heat losses) in a heat pump modality comprising the transfer of the latent heat of humidity condensation in the airflow at the lower temperature T1 to the seawater, at the higher temperature T2 of seawater evaporation. Compared to the mass flows of both humidity components (in the air and in the saline) and the enthalpies of vaporization proportional to these mass flows, the solar energy component is small. This solar energy converts the work of a heat pump engine. In case of the conventional heat pumps, this work of engine [A] transfers a significant amount of heat [Q] from the colder outside environment at temperature T1 into a warm building at a higher temperature T2, against the natural thermal gradient. The work of heat pump [A] adds to the heat [Q], and the combined energy warms a room during a cold season. Conversely, the higher temperature of a room can spontaneously produce work vs. colder environment, for example, by driving a thermoelectric effect. Because the transferred heat flows are many-fold higher than the non-spontaneous work required for heat transfer against the gradient, the theoretical water productivity per a unit of solar energy can be large.

The Coefficient of Performance (COP) for a heat pump in a heating or cooling application, with the steady-state operation, is:

$$COP_{heating} = \Delta Q_{hot}/\Delta A \leq T_{hot}/(T_{hot}-T_{cool}) \quad (1)$$

$$COP_{cooling} = \Delta Q_{cool}/\Delta A \leq T_{cool}/(T_{hot}-T_{cool}) \quad (2)$$

One can show that (2) converts in (1), considering:

$$\Delta Q_{hot} = \Delta Q_{cool} + \Delta A \quad (3)$$

Where $\Delta Q_{hot}/\Delta A$ is the ratio of the heat acquired by a hotter body in the heat-pump cycle to the work of providing such a cycle; analogously $\Delta Q_{cool}/\Delta A$ is the ratio of the heat lost by the cold body to the work of providing a cycle.

With a typical $COP_{heating}$ in the range 3-5 and potable water forming on both sides of the process, the amount of the latent heat of vaporization can be 5-10 fold greater than the solar energy consumed by the system, corresponding to ~50000 joules/sec from a 10 m$^2$ installation or ~50 gr of water/second. Thus, productivity per year is ~750 tons. However, the COP can be increased further, by intensifying and integrating heat and mass-transfer processes to the point of competing with reverse osmosis at much lower capital costs.

While this potable water productivity is below that observed for reverse osmosis, a solar-driven hybrid system is more reliable, resistant to perforations, erosion, fouling or concentration polarization (unlike reverse osmotic membranes), does not utilize high-pressure and expensive equipment, can be set up locally, and be installed as a part of the roofs in the cities. With these distinct comparative advantages, solar-driven hybrid distillation systems have found increasing popularity.

CN109580906 discloses a solar photo-electricity cogeneration system and a working method thereof. The system comprises a natural seawater storage tank (1), a condenser (3), a distributor (4), a ball valve A (9), a preheater (11), a solar heat collector (14), a gas-liquid separator (15), an expander (17); the generator (18), water pump (7), a freshwater storage tank (8), a ball valve B (12), a concentrated liquid pump (10), a concentrated liquid tank (5), The invention combines the solar device and seawater desalinization and power generation system. The scheme does not disclose compressor, heat-exchange of the compressed refrigerant with the saline, expansion of the coolant. The tract 8-11 describes heat-exchanger heating the saline. The source of condensed humidity is not atmospheric air transported by a propeller, but water vapor produced within the system by saline evaporation. A controlling automation system is not disclosed.

US20100314238A1 discloses a hydro-thermal exchange unit (HTEU) for desalinating feed water following humidification-dehumidification that includes feed water, freshwater and gas conduit circuits for transporting feed water, freshwater, and gas, respectively. The unit also includes an evaporator through which a portion of the feed water conduit and the gas conduit pass. The evaporator causes evaporation of a portion of the feed water to produce vapor that travels through the gas conduit. The unit also includes a condenser through which a part of the gas conduit and the freshwater conduit pass. The condenser has input and output ports for coupling the gas and freshwater conduit circuits. The condenser extracts humidity from the vapor transported therethrough by the gas conduit. The extracted humidity discharges through the freshwater conduit. The unit also includes a heat exchanger through which a portion of the freshwater conduit and the feed water conduit pass to thereby extract residual enthalpy from the freshwater such that the residual heat passes to the feed water. The system does not rely on a circulating refrigerant driven by a compressor and cooling by evaporating the saline, further expanding the compressed refrigerant and using the new temperature level to condense the water from airflow. The mass-transfer units of FIGS. 13-23 in the reference are sophisticated and require advanced manufacturing. An automation system regulating all flows based on the level sensor-mediated feedbacks is absent in the reference technology.

U.S. Ser. No. 10/207,935 discloses a hybrid desalination system for seawater which uses both filtering and a reverse osmosis filter system as well as evaporative distillation for the production of potable water. The hybrid desalination system includes a recovery system, which may be a reverse osmosis system, a forward osmosis system, or a combination thereof, for at least partially desalinating a volume of saltwater and outputting a treated fluid. A boiler is in fluid communication with the recovery system for receiving the treated fluid and producing pure water by evaporative desalination. The boiler includes an internal heating coil for passing a heated working fluid therethrough. A collection tank is in communication with the boiler for receiving the pure water. At least one solar parabolic trough is in fluid communication with the internal heating coil of the boiler for heating the working fluid.

US20080148744 discloses a water generator device from the air utilizing solar thermal energy and adsorption principle. The system is based on an adsorption refrigeration unit with ether as a refrigerant and activated carbon as adsorbed. The required heat is generated from the evacuated tube solar system, and the heat sink is the atmosphere. The adsorption unit is an air-cooled refrigeration unit that can operate at relatively low hot water temperature (60-70° C.) and relatively high atmospheric temperature (30-40° C.). The water condensed from the air is then driven through a simple water purification unit to assure its quality as drinking water. The small amount of electricity needed to operate the hot water and cold water pumps along with the filtration unit and the controller of the adsorption unit is generated from a small photovoltaic (PV) unit for stand-alone systems.

The publication titled "Solar-powered atmospheric water generation and purification system" (https://www.researchgate.net/publication/263618666_Solar-Powered_Atmospheric_Water_Generation_and_Purification_ System) discloses the Solar-Powered_Atmospheric_Water_Generation_and_ Purification_System (SAWGAPS) in a device that can collect water from atmospheric air. The initial set-up generated 18.3 liters of water in twenty-four hours with an average relative humidity of 69.2%. Within this period, it consumed 2 kilowatt-hour of energy per liter of water generated, purified and disinfected. All samples collected, after the condensation and after passing through a ceramic filter and ultraviolet (UV) irradiation, were tested and found to conform to the Philippine National Standards for Drinking Water (PNSDW) concerning the absence of coli form bacteria.

Refrigeration cycles rely on a compressor with expansion of a pre-cooled compressed refrigerant. However, the system lacks a sea-water evaporation component thermodynamically linked to the air dehumidification. Also, the refrigerant flow post-compressor is cooled by dehumidified airflow, and not by seawater feed, producing a different regime. There is no cooling of the solar battery by the expanded refrigerant. The regulation of levels of water condensates is not emphasized and the energy costs of the product are prohibitive, about 1000 fold above the RO benchmark.

The publication titled "Futuristic approach for thermal management in solar PV/thermal systems with possible applications" (https://www.sciencedirect.com/science/article/pii/S0196890418301043) discloses a PV/T system composed of [PV (photovoltaic)+T (thermal)], i.e. the simultaneous production of heat and electricity in an integrated manner. It provides an opportunity for the efficient utilizing of solar radiation which is eventually dissipated as waste heat in the PV cells, causing a decrease in the efficiency of the PV cells. The system applies water cooling to the solar cell. The hot water after the contact with the solar cell exchanges heat with an intermediate water circulation system, in thermal contact with airflow, however, the airflow passes not a dehumidifier but a radiator. Production of potable water is not the goal of the method, and the system is not configured for water production but for the optimal utilization of solar energy.

Thus, there is a need for a hybrid system for freshwater production that utilizes the latent heat of water vapor condensation of atmospheric air to cause water evaporation in a saline water feed, with a solar energy component driving a heat pump. There is also a need for hybrid systems that utilize passive heat from the environment, waste heat from diverse processes and residual heat from a brine concentrate with a solar component. Since the ratio of the transferred heat components [Q] to the driving energy [A] can theoretically be almost infinite in certain heat pump schemes, such regimes can exceed conventional technologies in terms of productivity and return on investment.

SUMMARY OF THE INVENTION

According to a first aspect, the invention discloses a freshwater generator for arid regions utilizing solar energy, humidity condensation from atmosphere and evaporation of saline, all linked thermodynamically into a single cycle.

According to a second aspect, the heat evolved in condensation of the atmospheric humidity is absorbed by the saline facilitating the saline evaporation.

According to a third aspect, the electric energy produced in the photovoltaic cell is supplied to the compressor and propeller and eventually becomes a component of the enthalpy of the refrigerant flow, wherein the thermal energy of the photovoltaic cell, compressor and propeller is also absorbed by the refrigerant flow and becomes another component of its enthalpy.

According to a fourth aspect, the compressed refrigerant incorporating most of the solar energy input is cooled by the saline, and in a cooled state is expanded in an expansion device, wherein the pressure is reduced, and a fraction of the refrigerant is adiabatically evaporated with the heat of evaporation supplied by the enthalpy of the refrigerant reducing the expanded coolant's temperature.

According to a fifth aspect, the post-expansion temperature of the refrigerant is below the temperature of the ambient atmospheric air wherein the heat-exchanger in thermal contact with the cooled coolant becomes the site of humidity condensation.

According to a sixth aspect, the waste heat of the outside sources can be added to the waste heat of the system's components to increase the effective COP of the system.

According to a seventh component, seawater feed entering the installation is a heat sink or coolant, causing a fraction of the air humidity to condense. The rest of the air humidity condenses by thermally contacting the expanded coolant. With both condensation steps generating the product, the cost of distillate per the life of the equipment is decreased.

According to an eighth aspect, the process proceeds at the elevated temperature and high Carnot COPs exceeding the values for the residential HVAC. Such regimes lead to increased vapor content of the vapor-air mixes, increased rate of mass and heat transfer, decreased compression work, lower surfaces of heat exchangers, increased heat capacity of the heat carriers. The resulting processes are cost-efficient.

According to a ninth aspect, the roof of the evaporating chamber consists of polyethylene film doped with nanoparticles interacting with the incident infrared photons and causing reflection, while at the same time transmitting visible light.

According to a tenth aspect, the infrared-trapping evaporation chamber accumulates waste, resident and passive heat of environment during the day and converts this excess enthalpy in the distillate product during the night.

According to an eleventh aspect, the process as described by the aspects (1)-(10) integrates with the sources of waste heat such as residential and agricultural HVAC, refineries, power plants, garbage incinerators, solar concentrators, geothermal heat, solar thermal heat collectors such as sand or asphalt.

According to a twelfth aspect, the hybrid system further integrates with reverse osmosis and/or reverse electrodialysis.

According to a thirteenth aspect, the circulating refrigerant is of molecular mass >180 Dalton and comprises not less than 4 carbons with all hydrogens substituted by fluorine. The improved heat carrier produces higher heat capacity per a circulating unit of volume and per the same amount of compression, further increasing the COP.

According to a fourteenth aspect, the combined capital and energy costs of distillate production are affordable for >90% of the nations' population.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7*b*: Pseudocode for compressor control conditions.

FIG. 7*c*: Pseudocode for fan control conditions.

DETAILED DESCRIPTION OF THE EMBODIMENTS

Figure 1:
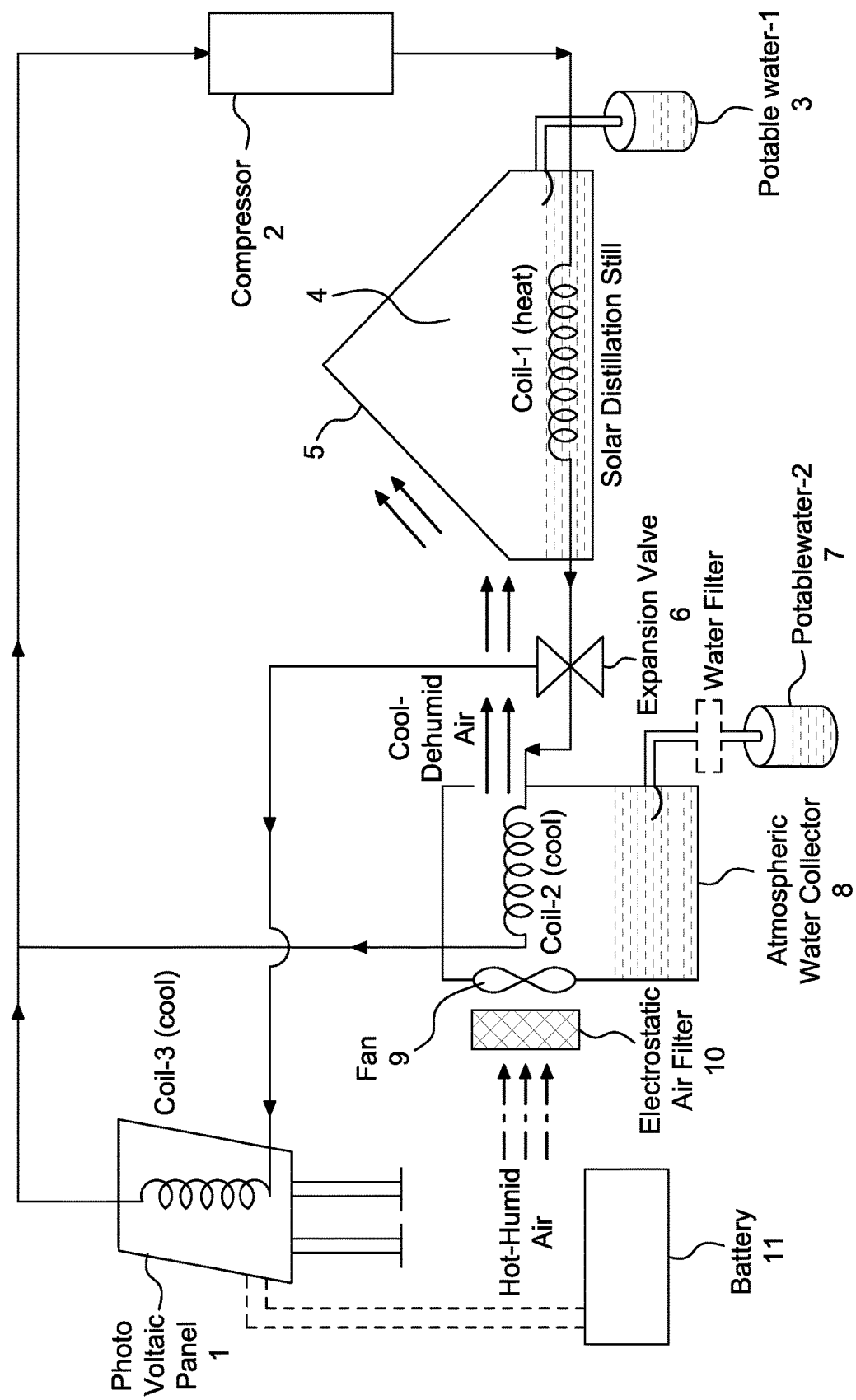
FIG. 1: The general scheme of an embodiment of a hybrid freshwater generator of the present disclosure.

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, anti-islanding protection is a safety feature that is built into grid-tied and hybrid grid-tied inverters, especially those that operate in the U.S. It may not be built into some inverters meant to operate in different countries. Anti-islanding protection is a way for inverters to sense when there is a problem with the power grid, such as a power outage, and shut itself off to stop feeding power back to the grid (for personnel safety reasons). A result of anti-islanding protection is that a purely grid-tied PV system will only operate when the power grid is active. If there is a power outage, the inverter will shut off, and although the solar panels may still be generating power, it will not be sent to consumers. A hybrid grid-tie system ensures that the consumers will still have a useable power source in batteries even if grid power is not available.

As used herein, the term "evaporation chamber" is equivalent to the terms "distillation chamber" or "still" or "evaporation still" or "solar still", wherein the evaporation chamber includes a closed volume where a heated fluid evolves its vapor, the vapor travels to a thin barrier limiting the chamber on the top and condenses due to the presence of a temperature gradient between the inside volume of the chamber and the outside environment.

As used herein, the terms "atmospheric water collector" and "evaporator" are equivalent, describing the unit that evaporates the expanded refrigerant and utilizes reduction in temperature associated with evaporation to condense and collect atmospheric moisture.

As used herein, the term "expansion device" refers to any of a throttle valve, dross valve, expander, piston expander, turbo expander.

As used herein, the term "counterflow" refers to the process of heat or mass exchange between the two flows, wherein the process has a driving force, wherein the directions of the flows are parallel and opposite. Both streams move in the ideal piston regime.

As used herein, the term "co-flow" or "parallel flow" refers to the process of heat or mass exchange between the two flows, wherein the process has a driving force, wherein the directions of the flows are parallel and concurrent. Both streams move in the ideal piston regime.

As used herein, the term "cross-flow" refers to the process of heat or mass exchange between the two flows, wherein the process has a driving force, wherein the directions of the flows are perpendicular. Both streams move in the ideal piston regime.

As used herein, the term "ideal mixing regime flow" refers to the process of heat or mass exchange between the two flows, wherein the process has a driving force, wherein the direction of one flow is defined, while the other flow proceeds in all random directions, wherein all elements of the second flow are thoroughly mixed.

OVERVIEW OF THE APPARATUS AND METHOD

FIG. 1 presents the general scheme of an embodiment of the inventive apparatus and method. The photovoltaic cell 1 serves as the primary driver of a cyclic process, supplying energy to a compressor 2, water pumps (e.g., positions 3 and 8), ventilator or fan 9, air filter 10, battery 11, and the sensors and processor described by FIGS. 6 and 7a-c. The photovoltaic cell absorbs solar energy in its p-n junction regions where due to a pre-existing charge separation the electron-hole pairs (excitons) dissociate and traffic to the electrodes, maintaining a potential difference and current through the circuit. The absorption of solar light also leads to relaxation of the photonic energy into vibrational and rotational motions which may include emission in the infrared spectrum (e.g., black body radiation). The result is heating of the photovoltaic cell since its protective glass facing traps this radiation (similarly to a car in a hot day or other forms of green-house effect).

PV manufacturers rate a PV system's susceptibility to temperature as the temperature coefficient, which is expressed as a percentage per degree Celsius. It is standard practice to test solar panels for power output at 25° C. If a panel is rated to have a temperature coefficient of −0.50% per ° C., that panel's output power will decrease by about one half of one percent for every degree the temperature rises about 25° C. (77° F.). At an efficiency rating of 17% and a temperature coefficient of −0.45, PV panels will lose 0.45% of their efficiency for every degree above 25° C. If the surface temperature increases to 30° C. (86° F.), the solar panel's efficiency will fall to 16.7 percent. If it increases to 35° C. (95° F.), efficiency falls to 16.3%. A software application HOMER PRO 3.13 is available for estimation of the solar cell temperature as a function of luminosity and thermal coefficient which may be used to aid in process optimization (see further discussion below).

Non-limiting examples of solar cells that may be thermally connected in embodiments of the inventive hybrid system include those of PV system installer Sunbooster which may include cooling technology for solar panels based on water. Other experimental and commercial methods that at least partially utilize synergy between cooling and PV system performance and can be used as components of the inventive system are disclosed in: Salem Ahmed M, Mohamed A S, Maghrabie H M. Performance evaluation of combined photovoltaic thermal water cooling system for hot climate regions. Journal of Solar Energy Engineering. 2019 Aug. 1; 141(4); Moharram K A, Abd-Elhady M S, Kandil H A, El-Sherif H. Enhancing the performance of photovoltaic panels by water cooling. Ain Shams Engineering Journal. 2013 Dec. 1; 4(4):869-77; Tang X, Quan Z, Zhao Y. Experimental investigation of solar panel cooling by a novel micro heat pipe array. Energy Power Eng. 2010 Aug. 24; 2(3):171-4; Mehrotra S, Rawat P, Debbarma M, Sudhakar K. Performance of a solar panel with water immersion cooling technique. International Journal of Science, Environment and Technology. 2014 June; 3(3):1161-72; Siecker J, Kusakana K, Numbi B P. A review of solar photovoltaic systems cooling technologies. Renewable and Sustainable Energy Reviews. 2017 Nov. 1; 79:192-203; Abdulgafar S A, Omar O S, Yousif K M. Improving the efficiency of polycrystalline solar panel via the water immersion method. International Journal of Innovative Research in Science, Engineering and Technology. 2014 January; 3(1):96-101; Peng Z, Herfatmanesh M R, Liu Y. Cooled solar PV panels for output energy efficiency optimization. Energy Conversion and Management. 2017 Oct. 15; 150:949-55; Zakharchenko R, Licea-Jimenez L, Pérez-Garcia S A, Vorobiev P, Dehesa-Carrasco U, Perez-Robles J F, Gonzalez-Hernandez J, Vorobiev Y. Photovoltaic solar panel for a hybrid PV/thermal system. Solar Energy Materials and Solar Cells. 2004 May 1; 82(1-2):253-61; Fakouriyan S, Saboohi Y, Fathi A. Experimental analysis of a cooling system effect on photovoltaic panels' efficiency and its preheating water production. Renewable Energy. 2019 Apr. 1; 134:1362-8; Mah C Y, Lim B H, Wong C W, Tan M R, Chong K K, Lai A C. Investigating the performance improvement of a photovoltaic system in a tropical climate using water cooling method. Energy Procedia. 2019 Feb. 1; 159:78-83; each incorporated herein by reference in their entirety.

A heat exchanger cools the solar cell 1 to the final temperature T1, and the refrigerant warmed in the cell is transported to the compressor 2 at the pressure P1. This pressure and temperature are constant from the point of the expanding valve to the entry in the compressor since the refrigerant consists of liquid and gaseous phases. The bulk of the refrigerant flow is liquid immediately after valve 6 and is in the gaseous form at the entry of the compressor. The compressor 2 produces a mechanical work on the coolant flow according to eq. 4:

$$A = \frac{nRT1}{(n-1)}\left[\left(\frac{P2}{P1}\right)^{(n-1)/n} - 1\right] \quad (4)$$

The heat exchanger used to cool the solar cell (1 in FIG. 1) is preferably configured to provide uniform cooling of the PV cell. While conventional PV cells may be cooled with a fluid heat transfer medium, the cooling is typically through a series of tubes that are disposed on a back surface of the PV cell and are spaced apart from one another. In the conventional system configuration cooling may lead to a series of temperature differentials across the PV cell where cooler sections represent portions of the PV cell battery in direct contact or in close proximity to the tube carrying the heat transfer fluid. Those portions of the PV cell that are relatively further away from such cooling tubes tend to have a higher temperature during operation. These heat differentials may lead to inefficiencies in the electricity-generating capability of the PV cell. In an embodiment of the present disclosure the solar cell (1) includes a heat exchanger on a back surface that includes a continuous chamber directly adjacent to the back surface of the PV cell. In contrast to a series of tubes, a single-chamber heat exchanger permits uniform heat exchange between the entire surface of the PV cell and the heat transfer fluid present in the heat exchanger.

In another embodiment of the present disclosure, the heat exchanger represents a single tube that repetitively crosses the back surface of the PV cell in a manner such that the portions of the PV cell that are not directly adjacent to the tube represent areas that are no wider than the outer diameter of the heat exchanger tube.

Where A is the compression work for a polytropic (non-adiabatic, realistic) compressor, n is the ratio between Cp/Cv; wherein Cp is the experimental heat capacity at the constant pressure, Cv is the experimental heat capacity at the constant volume; T1 is the temperature at the entry of the compressor, P2 is the pressure at the exit of the compressor, P1 is the pressure at the entrance.

The compressors associated with photovoltaic batteries (position 2 in FIG. 1) generally differ from the more common grid-associated counterparts by the need to transform the direct current into AC (alternating current) and increase its voltage. An electronic inverter (DC-AC converter) and transformer are provided with a compressor associated with a photovoltaic battery. Suitable commercially available inverters include: BESTEK 300 W Power Inverter DC 12V to 110V AC Car Inverter; Ampeak 2000 W Power Inverter 3 AC Outlets DC 12V to 110V AC Car Converter 2.1A USB Inverter; Foval 150 W Power Inverter DC 12V to 110V AC Converter; POTEK 2000 W Power Inverter Three AC Outlets 12V DC to 110V AC Car Inverter with USB Port; GOOSDA 750 W Power Inverter DC 12V to 110V AC Converter with 2.1A USB Dual AC Outlets Car Inverter. The photovoltaic battery preferably provides an initial 1.5-2.0 volts which is brought to the entry 12 volts by a transformer matching the power of the inverter, matching in-turn the power of the pump in its entire range, plus all other system components. For example, Ampeak 2000 W Power Inverter 3 AC Outlets DC 12V to 110V AC Car Converter 2.1A USB Inverter; AIMS Power 5000 Watt Modified Sine Power Inverter 12 Volt DC to 120 Volt AC with GFCI Outlets and AC Terminal Block.

The conversion equipment is preferably compatible with a local national grid infrastructure, to have the components readily available for ordering. As a non-limiting example, in Saudi Arabia the power plugs and sockets are of type A, B, C and G. The standard voltage is 110/220 V, and the standard frequency is 60 Hz. Inverters are available that specialize in serving the output parameters of photovoltaic cells. A solar inverter is a balance of system (BOS) component of a photovoltaic system and can be used for both grid-connected and off-grid systems. Solar inverters have special functions adapted for use with photovoltaic arrays, including maximum power point tracking and anti-islanding protection. Solar micro-inverters differ from conventional inverters, as an individual micro-inverter is attached to each solar panel. This can improve the overall efficiency of the system. The output from several micro-inverters is then combined and often fed to the electrical grid. A DC-to-DC converter is an electronic circuit or electromechanical device that converts a source of direct current (DC) from one voltage level to another. It is a type of electric power converter. Power levels range from very low (small batteries) to very high (high-voltage power transmission).

In other applications, a conventional inverter can be combined with a battery bank maintained by a solar charge controller. This combination of components is often referred to as a solar generator. Non-limiting examples of all-in-one solar generator kits adapted to produce a usable standardized AC output starting with a low voltage DC include Patriot Power Generator 1800; 4.8 KWH YETI EXPANSION KIT WITH HIK; Jackery Portable Power Station Explorer 1000, 1002 Wh Solar Generator (Solar Panel Optional) with 3×110V/1000 W AC Outlets, Solar Mobile Lithium Battery Pack for Outdoor RV/Van Camping, Emergency; NATURE'S GENERATOR 1800-Watt Solar Powered Portable Generator with Electric Start; NATURE'S GENERATOR 3600-Watt Electric Start Solar Powered Portable Generator with 2 Electric Start Solar Panels and Power Transfer Kit; NATURE'S GENERATOR 1920-Watt Hour Portable Solar Generator; each incorporated herein by reference in entirety. There is an abundant market of the individual components that can be integrated into a custom system or there is a market of solar generators, combining the inverter, DC-to-DC converter and battery in a single set, with the accessories providing compatibility to the specific grid parameters. In a preferred embodiment, a solar generator kit with the pre-defined power output drives the inventive machinery and sensors in the same manner as a connection to the standardized national grid would do.

Apart from the power supply other compressor models suitable for heat pump applications are suitable for the needs of the inventive hybrid system such as Danfoss HHP heating optimized scroll compressors. Also suitable are all vertical single Copeland Scroll compressors for dedicated heat pump applications, Coleman Heat Pump Compressor, Turbo-compressors for heat pumps, Rheem heat pumps. The use of standardized HVAC (humidifier, ventilator, air-conditioner) equipment brings the benefits of low costs, easy maintenance, and technical servicing, with the entire package of the equipment worth several thousand USD. Other elements of the system are either low-tech or can be borrowed from the HVAC field (such as fans, pumps and dehumidifiers).

In some embodiments, the heat of compression and the waste heat of the compressor's engine can be allowed to radiate to the environment as losses. In a preferred embodiment, the compressor is cooled not by a refrigerant flow but by the seawater, e.g., preferably only seawater, that afterwards enters the evaporation chamber 4, increasing the amount of heat conferred to evaporation. In yet more preferred embodiment, the conduit carrying the seawater in the evaporative chamber 4 follows the propeller 9 and/or photovoltaic cell 1, as well as the compressor 2. In other preferred embodiments, the roof of the chamber 4 is made of a transparent material transmissive to visible solar radiation and retaining the infrared radiation, further increasing solar energy utilization (below). In order to use seawater to cool compressor 2 in FIG. 1 it is important to protect the compressor from the corrosive effects of sea water. There are several options for doing so. In one option the seawater is piped through a heat exchanger chamber mounted directly onto the compressor. The heat exchanger chamber is directly adjacent to the pistons or other compression mechanism used to compress the heat exchange fluid that is circulated in the inventive system. The heat exchanger chamber is preferably constructed from stainless steel and is hermetically sealed such that seawater does not leave the chamber or otherwise directly contact the compressor. The exit from the heat exchanger chamber is then fluidly connected with the distillation still 4 shown in FIG. 1.

The solar-powered compressors and pumps are disclosed in U.S. Pat. Nos. 6,469,487; 8,997,510; 6,253,563; Biancardi F R, Meader M D, Blecher W A, Hall J B. Design and operation of a solar-powered turbo-compressor air-conditioning and heating system. Iniece 1975 (pp. 186-194); Sun D W. Solar-powered combined ejector-vapor compression cycle for air conditioning and refrigeration. Energy Conversion and Management. 1997 Mar. 1; 38(5):479-91; Soules T R, Tran P V. Solar-Powered Air Compressor: An Economical and Ecological Power Source for Remote Locations. In Middle East Oil Show 1993 Jan. 1. Society of Petroleum Engineers; Coppitters D, Contino F, El-Baz A, Breuhaus P, De Paepe W. Techno-economic feasibility study of a solar-powered distributed cogeneration system producing power and distillate water: Sensitivity and exergy analysis. Renewable Energy. 2020 May 1; 150:1089-97; Li H, Gong X, Xu W, Li M, Dang C. Effects of climate on the solar-powered R1234ze/CO2 cascade cycle for space cooling. Renewable Energy. 2020 Jun. 1; 153:870-83; Sahu S K, Kumar N S, Ganapathy T. Experimental Investigation of Solar Powered Vapor Compression Air Conditioner with Indian Climatic Condition. In Advances in Mechanical Engineering 2020 (pp. 1291-1302). Springer, Singapore; Prabhakaran K S, Visagavel K. Performance improvement of solar-powered evaporative cooler using versatile ecological balanced control technique. Microprocessors and Microsystems. 2020 Feb. 1; 72:102900; Ma Z, Ren H, Lin W. A review of heating, ventilation and air conditioning technologies and innovations used in solar-powered net-zero energy Solar Decathlon houses. Journal of Cleaner Production. 2019 Dec. 10; 240:11815; each incorporated herein by reference in its entirety.

The flow of the refrigerant post-compressor is a hot pressurized gas, that accumulated all enthalpy extracted from the waste heat components and latent heat of water vapor condensation in the air driven by the fan 9. The hot compressed refrigerant enters the evaporative chamber 4, where the compressed coolant loses the enthalpy to the seawater, promoting its evaporation and condensation on the roof barrier 5, a thin film facilitating high rate of heat-exchange with the outside airflow. Additionally, the evaporative chamber can (in preferred embodiments) absorb the solar energy directly and trap the resulting heat (infrared photons) by the infrared-reflecting barrier film as well as by heat insulation of its walls.

Figure 2:
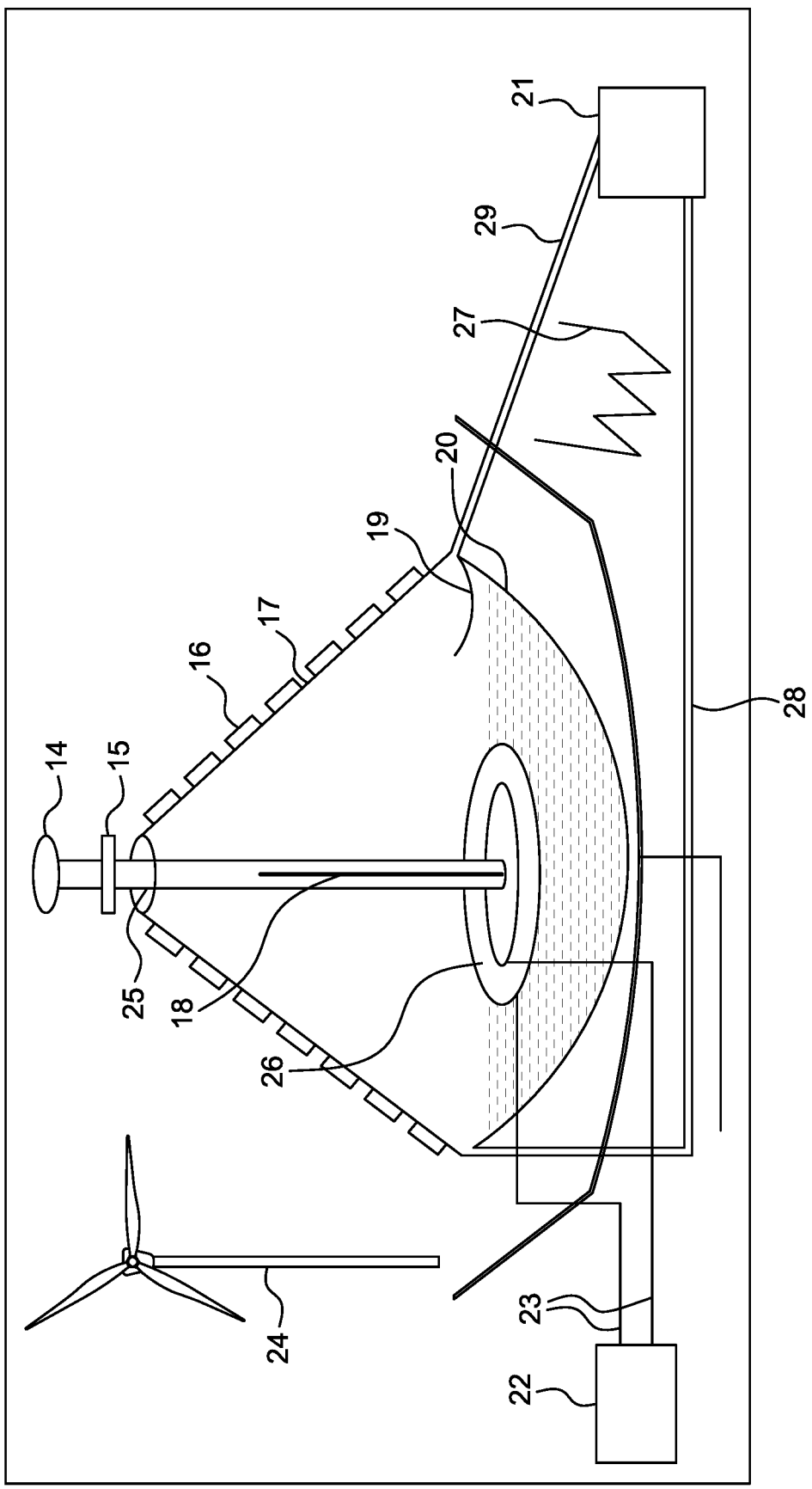
FIG. 2: The parts of an exemplary evaporator chamber.

FIG. 2 presents a preferred embodiment of a suitable evaporative chamber 4. The brine/saline water collector 20 is filled, and charcoal is optionally present to improve evaporation by capillary effect and black body radiation. A transparent, preferably polycarbonate, cone 17 is placed on the support pan housing the brine (position 5 in FIG. 1). In some embodiments, the surface of polycarbonate cone 17 may serve as a mounting surface for solar cells 16 to increase the energy yield. Alternatively, a wind powered device such as windmill 24 generates electricity as a renewable source of energy, which is stored in battery 22. Floating mixer 26 is placed into the middle of the housing 29 which accelerates evaporation of the heated brine, and at the inner surface of polycarbonate cone 17 the vapor condenses generating distilled water. By using distilled water collector 19, the distilled water is collected from inside of the polycarbonate cone 17 and stored in the storage tank 21. The angle of the cone is designed to allow the water droplets to grow, but remain attached to the plastic surface before sliding in the collecting groove by the force of gravity. Too flat roof cone 17 would lead to the distillate droplets falling back in the saline, while a too narrow roof cone would lead to impractical dimensions of the apparatus. In the preferred embodiments, the angle between the sides of the conical roof 17 measured at the top is from 30 to 60 degrees, more preferably from 35 to 55 degrees and even more preferably from 40 to 50 degrees.

The input and output of the brine is maintained for example by a Venturi volume flow meter 15. In some embodiments, the shaft 25 is sealed in the cylindrical channel 14 of the polycarbonate cone 17. In some embodiments, the parts 14, 15, 16, 18 and 26 are absent, and therefore there is no necessity to seal the annular spacing at the top of the polycarbonate cone 17. In some embodiments, the content of the evaporation chamber is mixed by a magnetic stirrer (not shown) actuating the mixer 26. In some embodiments, the compressed refrigerant enters the evaporation chamber via pipe 27, which can be multiple to accelerate the heat transfer. The heat transfer rate accelerates due to the extended surface of heat exchange existing on multiple tubes and due to a higher surface-to-volume ratio for the smaller tubes.

In an illustrative non-limiting example, at the length of a heat exchanger 3 m, and a volume flow 0.01 m$^3$/sec, the same linear velocity of 1 m/sec is observed in a single heat-exchange pipe measuring 0.01 m$^2$ in inner cross-section area and 0.08 m in radius. The surface to volume ratio for this pipe is (2/r) or 12.52. Ten pipes with the cross-section 0.001 m2 and the radius 0.024 m provide the same volume flow at the same linear velocity. The surface-to-volume ratio for these pipes is 37.5. The pipe surface in the first case is 1.5 m$^2$ and 5 m$^2$ in the second case. Both parameters—the total surface of the heat-exchanger and the surface-to-volume ratio determine the efficiency.

The saline exits via the pipe 28. With the temperature ~60° C., there is still enthalpy in this saline concentrate flow which can be extracted. One method of extraction is to contact the outgoing concentrate with a water-absorbent gel column and cause evaporation of the excess water becoming unbound at the increased temperature.

The publication U.S. Pat. No. 4,146,372 incorporated herein by reference in its entirety (see FIG. 1 and FIG. 3 of this reference as the especially preferred exemplary embodiments) discloses the recovery of moist from air by a process utilizing the differences in the day-time and night temperatures of such air. The process is especially useful in subtropical desert areas. It comprises alternately removing the moisture from the cool night air by adsorption on suitable adsorbing agents and especially on silica gel and by utilizing the hot day-time air and, if desired and available, the radiation energy of the sun for desorption of the water stored in the adsorbing agent and for condensing the desorbed water by means of the cold stored during the night. Alternatively, the stored fresh water is recovered by passing the warm salt concentrate via a heat exchanger placed around the absorbing column (FIG. 4*a*).

Figure 4A:
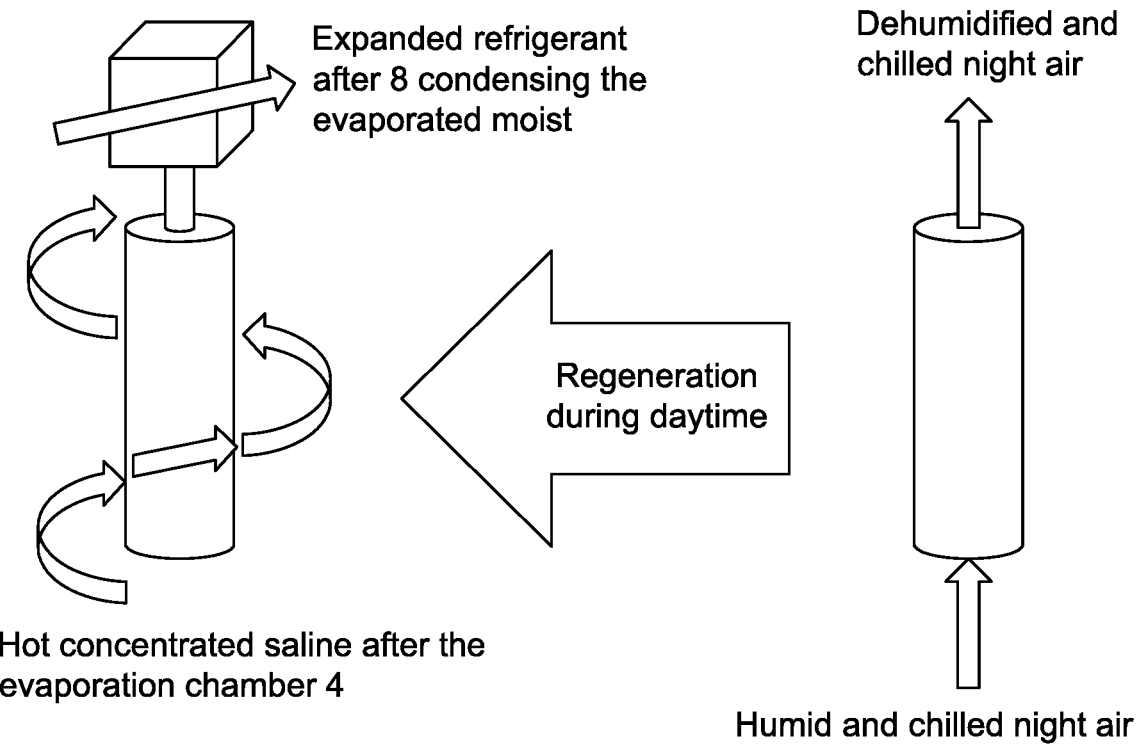
FIG. 4*a*: A scheme for a silica-gel column charging and regeneration.

FIG. 4*a* illustrates a typical charging-regeneration cycle of the silica-gel based column. The column is saturated with moist during nighttime by passing the cooled and humid air. The same column is regenerated during the daytime by the heat of the brine concentrate exiting the evaporation chamber 4. The dissociated moist condenses at the top of the apparatus (water vapor is lighter than air) after cooling by the expanded refrigerant after the stages 6 or 8 of FIG. 1.

The publications U.S. Pat. Nos. 4,345,917, 4,285,702, 4,365,979, FR2473489, U.S. Pat. No. 5,846,296, WO9907951, U.S. Pat. No. 6,251,172, US2006278089, US2007220843, US2007028769, US2009151368, US2013263530, US2018171604, WO19141923 are incorporated herein by reference each in its entirety and disclose the additional embodiments of the similar technology (as illustrated by FIG. 4*a*) and the variations in the associated hardware.

In a preferred embodiment, the concentrate flow 28 is distributed over a wide tray (see below FIG. 5*c*) and atmospheric air blown by the fan 9 of FIG. 1 passes over the warm surface of the brine concentrate in the tray, becoming over-saturated with water vapor at the higher temperature before contacting the atmospheric water collector 8 housing the cooled refrigerant after the throttle valve 6 (below). This step uses the enthalpy of the warm concentrate to produce a portion of water vapor with little additional resistance to the airflow and the negligible increase in the mechanical workload of the fan 9. For example, the partial water vapor pressure of the ambient atmospheric air is 0.055 atm at 35° C. and 100% saturation. However, the partial vapor pressure increases to 0.246 atm at 60° C. and 100% saturation. The amount of water vapor condensed in the evaporative chamber 4 is proportional to the amount of condensation in unit 8 of FIG. 1 (through the heat pump relationship), and the COP and productivity per a unit of capital costs drastically increase.

In a preferred embodiment, activated charcoal floats on the surface of saline in the evaporation chamber 4. The activated carbon comprises durable, regular shapes, such as spheres or cubes, increasing the vapor pressure at the given temperature by the capillary pressure component (being hydrophobic), such that the boiling temperature of water shifts down by several degrees (similar to the "boiling stones" effect used in the solvent removal steps in organic synthesis). The combination of the black pigment within the brine and infrared-trapping transparent plastic roof attracts solar heat, while a wind-driven electrical generator and optionally the photovoltaic patches 16 produce the additional electric energy.

The compressed refrigerant enters a heat exchanger in the evaporative chamber 4 at pressure P2 and temperature T2. The refrigerant moves in the tubing 27 and cools to the temperature T3, while remaining at the pressure P2 due to work of compressor and the absence of hydraulic obstacles. The refrigerant is preferably in a gaseous subcritical form upon entry into the chamber 4 and can liquify at the pressure P2 as soon as its temperature falls to the temperature T3 corresponding to the point of condensation at the given pressure. Due to the heat of liquefaction, it will retain the temperature T3 until the entire mass liquefies. Under these assumptions, one can write an energy balance in the evaporation chamber 4:

$$H_1 = M_r C_p (T3-T2) + S + M_r H_l = M_w H_w \qquad (5)$$

Where $H_1$ is the heat transferred from the refrigerant flow $M_r$ to the evaporative chamber 4 which evaporates the amount of water $M_w$, wherein $H_l$ is the enthalpy of condensation for the refrigerant, and $H_w$ is the enthalpy of evaporation for water. The term S is the solar radiation directly trapped in the chamber 4 or other additional sources of heat. The equation (5) considers the heat transfer from the compressed gaseous coolant from the temperature T2 post-compressor to the condensation temperature T3 with the heat capacity Cp at the constant pressure P2. Thus, the condition of choosing a correct working fluid for the cycle is the ability to liquify in the evaporative chamber 4 at the temperatures ≤100° C. upon the contact with the warm water. For example, the temperature of the incoming water after absorbing all sources of waste heat and the solar energy directly in the still is in the 50-80° C., preferably 55-75° C., more preferably 60.-65° C. range. To enable heat transfer to warm saline, the temperature of the compressed refrigerant should be above that of the saline. Further in the conduit, condensation of the refrigerant begins at the temperature T3. Liquification of the refrigerant is essential for the intended closing of the heat cycle. The boiling temperatures of the refrigerants at 1 atm partial pressure are provided in Table 1.

TABLE 1

Refrigerants and their boiling points at one-atmosphere partial pressure.

| Refrigerant No. | Name | Molecular Mass | Boiling point at atmospheric pressure 14.7 psia, 1 bar abs (° F.) | Freezing Point at atmospheric pressure 14.7 psia, 1 bar abs (° F.) | Critical Point Temperature (° F.) | Critical Point Pressure (psia) | Specific Volume (Cu. Ft./lb.) |
|---|---|---|---|---|---|---|---|
| R-10 | Carbontetrachloride | 153.8 | 170.2 | | | | |
| R-11 | Trichlorofluoromethane[1]) | 137.37 | 74.9 | −168 | 388 | 640 | 0.0289 |
| R-12 | Dichlorodifluoromethane[2]) | 120.91 | −21.8 | −252 | 234 | 597 | 0.0287 |
| R-13 | Monochlorotrifluoromethane | 104.46 | −114.6 | −294 | 84 | 561 | 0.0277 |
| R-13B1 | Bromotrifluoromethane | 148.91 | −72 | −270 | 153 | 575 | 0.0215 |
| R-14 | Tetrafluoromethane (Carbon tetrafluoride) | 88.00 | −198.2 | −299 | −50 | 543 | 0.0256 |
| R-14 | Chloroform | 119.4 | 142 | | | | |
| R-21 | Dichlorofluoromethane | 102.92 | 48.1 | −211 | | | |
| R-22 | Difluoromonochloromethane[3]) | 86.468 | −41.3 | −256 | 205 | 722 | 0.0305 |
| R-23 | Trifluormethane | 70 | −119.9 | | | | |
| R-30 | Methylene Chloride | 84.9 | 105.2 | | | | |
| R-31 | Monochloromonofluoromethane | 68.5 | 48.0 | | | | |
| R-32 | Methylene Fluoride | 52.0 | −61.4 | | | | |
| R-40 | Chloromethane (Methyl Chloride) | 50.488 | −10.7 | −144 | 290 | 969 | 0.0454 |
| R-41 | Methyl Fluoride | 34.0 | −109 | | | | |
| R-50 | Methane | 16.044 | −259 | −296.6 | | | |
| R-110 | Hexachloroethane | 236.8 | 365 | | | | |
| R-111 | Pentachloromonofluoroethane | 220.3 | 279 | | | | |
| R-112 | Tetrachlorodifluoroethane | 203.8 | 199.0 | | | | |
| R-113 | Trichlorotrifluoroethane[4]) | 187.39 | 118 | −31 | 417 | 499 | 0.0278 |
| R-114 | 1,2-dichloro-1,1,2,2-tetrafluoroethane | 170.92 | 38.4 | −137 | 294 | 473 | 0.0275 |
| R-115 | Chloropentafluoroethane | 154.47 | −38.0 | −149 | 176 | 458 | 0.0261 |
| R-116 | Hexafluoroethane | 138.0 | −108.8 | | | | |
| R-120 | Pentachloroethane | 202.3 | 324 | | | | |
| R-123 | Dichlorotrifluoroethane[5]) | 152.93 | 82 | −161 | 363 | 533 | |
| R-124 | Monochlorotetrafluoroethane | 136.5 | 10.4 | | | | |
| R-125 | Pentafluoroethane | 120 | −55 | | | | |
| R-133a | Monochlorotrifluoroethane | 118.5 | 43.0 | | | | |
| R-134a | Tetrafluoroethane[6]) | 102.03 | −15 | −142 | 214 | 590 | 0.0290 |
| R-140a | Trichloroethane | 133.4 | 165 | | | | |
| R-142b | 1-chloro-1,1-difluoroethane | 100.50 | 14 | −204 | 279 | 598 | 0.0368 |
| R-143a | Trifluoroethane | 84 | −53.5 | | | | |

TABLE 1-continued

Refrigerants and their boiling points at one-atmosphere partial pressure.

| Refrigerant No. | Name | Molecular Mass | Boiling point at atmospheric pressure 14.7 psia, 1 bar abs (° F.) | Freezing Point at atmospheric pressure 14.7 psia, 1 bar abs (° F.) | Critical Point Temperature (° F.) | Critical Point Pressure (psia) | Specific Volume (Cu. Ft./lb.) |
|---|---|---|---|---|---|---|---|
| R-150a | Dichloroethane | 98.9 | 140 | | | | |
| R-152a | Difluoroethane | 66.05 | −13 | | | | |
| R-160 | Ethyl Chloride | 64.515 | 12.2 | −218 | | | |
| R-170 | Ethane | 30.070 | −127 | −278 | 90 | 710 | 0.0830 |
| R-218 | Octafluoropropane | 188 | −36.4 | | | | |
| R-290 | Propane | 44.097 | −44 | −309.8 | 206 | 617 | 0.0728 |
| RC-318 | Octafluorocyclobutane | 200.04 | 22 | −43 | 240 | 404 | 0.0258 |
| R-410A | R-32 Difluoromethane (50% weight), R-125 Pentafluoroethane (50% weight) | 72.6 | −55.4 | | 162 | 690 | |
| R-500 | Dichlorodifluoromethane/ Difluoroethane[7] | 99.31 | −28 | −254 | 222 | 642 | 0.0323 |
| R-502 | Chlorodifluoromethane/ Chloropentafluoroethane | 111.63 | −50 | | 180 | 591 | 0.0286 |
| R-503 | Chlorotrifluoromethane/ Trifluoromethane | 87.50 | −128 | | 67 | 607 | 0.0326 |
| R-600 | n-Butane | 58.12 | 31.2 | −217 | 306 | 551 | 0.0702 |
| R-600a | Isobutane (2-Methyl propane) | 58.12 | 10.8 | −229 | 275 | 529 | 0.0725 |
| R-611 | Methyl formate | 60.05 | 89 | −146 | 417 | 870 | 0.0459 |
| R-702 | Hydrogen | 2.016 | −423 | −434.6 | | | |
| R-704 | Helium | 4.0026 | −452 | | | | |
| R-717 | Ammonia | 17.02 | −28 | −107.9 | 271 | 1657 | 0.0680 |
| R-720 | Neon | 20.179 | −410.9 | −415.6 | | | |
| R-728 | Nitrogen | 28.0134 | −320.4 | −346 | | | |
| R-729 | Air | 28.966 | −320 | −357.2 | | | |
| R-732 | Oxygen | 31.9988 | −297.3 | −361.3 | | | |
| R-740 | Argon | 39.948 | −303 | −308.5 | | | |
| R-744 | Carbon Dioxide | 44.01 | −109.4 | −70 | 88 | 1070 | 0.0342 |
| R-744A | Nitrous Oxide | 44.012 | −127.3 | −131.5 | | | |
| R-764 | Sulfur Dioxide | 64.06 | 14.0 | −104 | 316 | 1143 | 0.0306 |
| R-1150 | Ethylene | 28.05 | −155 | −272 | 49 | 742 | 0.0700 |
| R-1270 | Propylene | 42.08 | −54 | −301 | 197 | 670 | 0.0720 |

According to Table 1, the boiling temperature and molecular mass of the refrigerants are the most important parameters determining the choice for a given set of conditions. The boiling temperature is important because, together with the target temperatures in the cycle, it defines the working pressure post-compressor, working pressure post-expander, and together with the geometry of the expander—the pressure difference and flow rate of the refrigerant in the system. The working pressure post-expander also defines the volume density of the refrigerant flow. Together with the flow rate, this parameter defines the heat-transfer rate and heat capacity of the refrigerant in the post-expander segment of the cycle. The heat transfer rate is proportional to the product of the volume density by the flow rate of the coolant. The heat capacity is also proportional to the volume density and flow rate.

The molecular mass factor is important because all gases occupy the same volume per 1 mole and require comparable compression work at different molecular masses and structure complexity. At the same time, the heat capacity is proportional to the number of vibrational, torsional, and rotational degrees of freedom in a molecule, as well as to the equivalent masses of the oscillators in each degree of freedom. The gases with higher molecular masses and more complex molecules (higher boiling points) demonstrate higher heat capacity per cycle and per unit of compression work.

Figure 3:
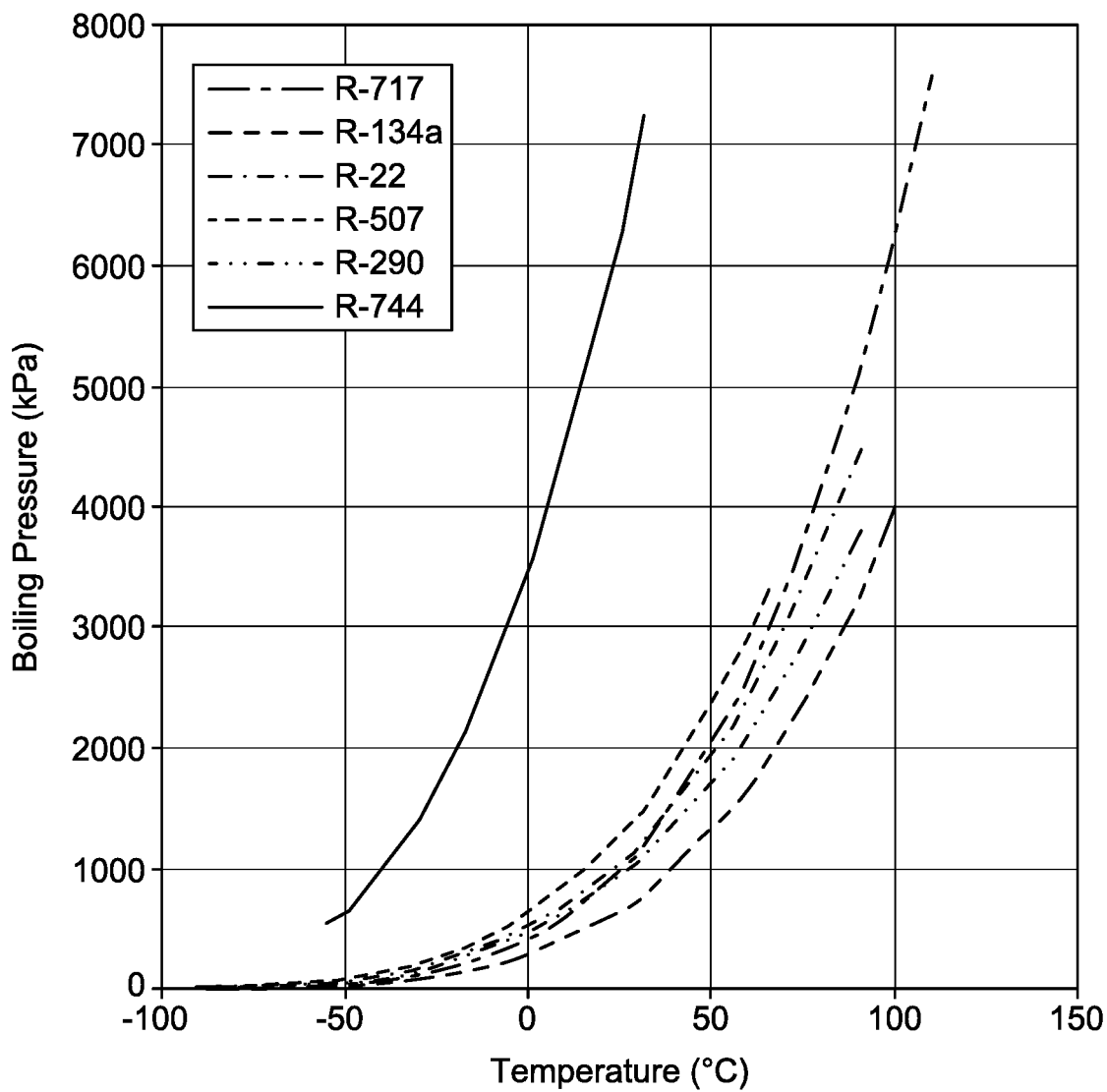
FIG. 3: Boiling pressure at different temperatures for typical refrigerants.

For lighter gases, the required pressures of liquefication significantly exceed one atmosphere at the temperatures >0° C., and such regimes require heavier equipment, pressure containment, the safety and corrosion controls. For heavy gases, a pressure post-expander is insufficient for supporting effective heat exchange due to low mass flow, and the heat cycle cannot function as intended. In a non-limiting embodiment, FIG. 3 presents some acceptable choices of refrigerants. R-600a (isobutane) liquifies at the temperatures >60° C., and must be compressed to the P2>10 atm to liquify at this temperature. For carbon dioxide this temperature (60° C.) is supercritical. For comparison, R-10 (carbon tetrachloride) boils at 170° F. or 76.6° C. at 1 atm. However, higher pressures (lower boiling temperatures) are needed to force the liquefied coolant through the throttle valve and ensure that the resulting vapor pressure after the expansion is not too low. These conditions impose constraints on the choice of refrigerant.

In a preferred embodiment, R134a (Tetrafluoroethane) is a refrigerant for medium-sized or large heat pump systems (including the inventive system); R407c and R410a are frequently used in small to medium sized heat pump systems; R600 (butane) and R600a (isobutane) are used for refrigeration installations. The common feature between these working fluids is the ability to liquefy at reasonably elevated pressures P2 post-compressor and temperatures ~60° C., and maintain the sufficient pressure of coolant after throttling. FIG. 3 presents the boiling temperature-pressure diagrams for the refrigerants and illustrates the selection rationale. In case of R134a, the required pressure P2 to liquefy the R134a gas at 70° C. is ~3 atm. Throttling reduces the pressure 10-fold to 0.3 atm with the equilibrium temperature ° 0 C of the coolant evaporation. At the post-expansion pressure 0.3 atm, and pressure difference 2.7 atm, the mass flow of cold gas is still sufficient to support rapid heat-exchange, the liquid phase is expected to entrain in the gas flow and travel concurrently. Use of ammonia (R-717) is less favorable. At the same temperature of condensation post-compressor, the ammonia flow requires 5 atm of compression and to ensure the equilibrium temperature ° 0 C of the coolant evaporation, ammonia needs to expand to 0.5 atm. The index $(n-1)/n$ in the formula (4) for the work of compression is closer to 0 for R134a and therefore the work of compression, and the required final pressure are lower for R134a (by 30%) per a unit of volume at the same temperature T1. The expression (6) below provides the ratio for the enthalpies carried by the material flows in case of R134a and R717.

$$H_{R134a}/H_{R717}=([P_{R134a}]/[P_{R717}])^{1.5}([Cp_{R134a}]/[Cp_{R717}])([M_{R134a}]/[M_{R717}])([W_{R717}]/[WR_{134a}]) \quad (6)$$

$$H_{R134a}/H_{R717}=(3/5)^{3/2}(0.2/0.5)(98/17)(1.5/1)=1.6$$

Where P is the pressure of the coolant post-compressor, Cp is the heat capacity per the unit of mass at the constant pressure, M is the molecular mass, W is the work of compression according to (4). The exponent 1.5 over the pressure ratio accounts for the difference in flow rates (higher for ammonia) proportional to $P^{0.5}$. The result (6) explains why R134a is on the list of the leading working fluids for the residential heat pumps and ammonia is not, while being widespread in deeper freezing systems, where its transition characteristics become more economical. Likewise, for higher temperature regimes, other freons become more economical (see Examples), generally, the higher working temperatures leading to improved economy.

Sea-water flow is maintained by the pump carrying the brine from sea-level to the elevation where the system is located. Depending on the elevation, the flow of seawater can be higher or lower. Lifting one m³ of the brine to an elevation of 400 m over the sea level (a typical level for the most human settlements) requires the energy of 1025 [kg]× 9.81 [m/s²]×400 [m]=$4.2×10^6$ joules before considering any losses. The water transportation energy requirement is much higher, however, considering that not all of the mass of the saline translates into the product, but only a fraction, with the rest returning to the environment as a concentrate. The pumps utilize high-quality electric energy and not waste heat. This requirement means that the sites for establishing the inventive desalination process preferably lie closer to sea-level, avoiding higher altitudes and elevations.

Pumps suitable for the inventive system can be piston pumps, turbo-pumps, Venturi pumps, peristaltic pumps without limitation. Corrosion resistance of metal components in the pump is preferable since exposure to saline is combined with intense mechanical work. Suitable pump systems include Tsurumi pumps, centrifugal pumps by DESMI, Mercury Sea Pumps, Hydra-Cell saltwater pumps, KoolAir 5011370A PM500 Submersible Seawater Pump 500, Seawater Pumps—Sure Marine, Ultraflex Group, Sea Water Pumps by Ocean Footprint. Pumping systems considered suitable for transporting fracturing fluids are also suitable for this invention.

An advantage of the pumping of the invention relates to the disposal and re-use of the concentrated brine after the intended portion of the feed is distilled off. In some embodiments the seawater is pumped in a centralized fashion to the processing plant while the concentrated brine is disposed of in a centralized manner as well, producing mechanical work convertible in electric power on its path down from a higher altitude. In other embodiments, both flows (in and out) may pass through a reverse electrodialysis module, where the multiple contacts between the chambers carrying the saline of lower and higher concentration produce significant voltage difference, driving the pumps (See: Lacey R E. Energy by reverse electrodialysis. OcEng. 1980; 7(1):1-47; Turek M, Bandura B. Renewable energy by reverse electrodialysis. Desalination. 2007 Feb. 5; 205(1-3):67-74; Post J W, Veerman J, Hamelers H V, Euverink G J, Metz S J, Nymeijer K, Buisman C J. Salinity-gradient power: Evaluation of pressure-retarded osmosis and reverse electrodialysis. Journal of membrane science. 2007 Feb. 1; 288(1-2):218-30; each incorporated herein by reference in its entirety). The method relies on the unequal Donnan's potentials developing on the interface between saline at the given concentration and a flat ion-exchange membrane. The side bordering a channel with a higher saline concentration gains a higher potential, and the stack of ion-exchange membranes produces voltages up to +150 V. The ion-exchange membranes, the apparatus and corrosion protection are relatively expensive, making this embodiment less preferred.

In some embodiments, the pressure of the water column from the distillation center located uphill can drive a reverse osmosis (RO) process, generating the additional fresh-water mixing with the uphill portion after automatic quality control, while the RO concentrate follows to the reverse electrodialysis to produce the electric power that drives the additional machinery (RO module, pumps, valving, reverse ED module). The reverse osmosis requires overcoming of the direct osmotic pressure of seawater reaching 30 atm before the membrane passes the desalinated permeate. The delivery of the saline to the altitudes >400 m would correspond to the pressures at this level, and the use of this hydrostatic head would require only a small increment of pressure back on the seacoast. This embodiment may increase and potentially double the distillate yield, while some infrastructure (pumps, electric components, solar panels, sensors, processor, piping) is shared between the stages, reducing the capital costs.

In another embodiment, the extent of saline processing increases. The natural content of electrolytes in seawater is ~0.6 mole per liter (In A. G. Dickson; C. Goyet (eds.). Handbook of methods for the analysis of the various parameters of the carbon dioxide system in seawater. 2. ORNL/CDIAC-74, DOE (1994); incorporated herein by reference in its entirety). Sodium chloride is the dominant component (~85% of all electrolytes), followed by magnesium chloride, sodium sulfate and magnesium sulfate. According to Solubility Database by International Union of Pure and Applied Chemistry/National Institute of Standards and Technology, the solubility of sodium chloride is ~350 gr/liter or ~6 moles/l. While separating the distilling water and concentrated saline is progressively difficult with higher concentrations, at least 50-60% of the initial feed can be sequentially evaporated in multiple chambers 4 or by maintaining the brine feed long enough in a single evaporation chamber. The waste brine with the salt content above 1.1 of the natural level is toxic for the marine life at the site of disposal, and this toxicity rapidly increases with concentration, conflicting with environmental conservation and fishing.

In some embodiments, the residential settlement in need of freshwater is located far from the sea or other sources of brine. In case of low production volume, the brine can be delivered by a car or train in cisterns or tanks made of non-corrosive materials and the concentrate after freshwater extraction carried off. More preferably, the means of transportation deliver the needed freshwater uphill, while the processing plant is at the sea level. In yet another embodiment, all installations are local, and the source of water is not seawater, but rainwater from the pools, trenches, agricultural lands, recycled water contaminated by the solutes that need removal. In these cases, the distillates need post-processing by activated carbon and low-pressure desalination/ion-exchange columns which are relatively cheap and do not require significant additional capital costs. In some embodiments, the re-processed water is consumed by agriculture and hygienic needs only, while the drinking water is purchased in a bottled form.

In some embodiments, solar concentrators facilitate solar energy utilization at the sea level, and the extra power drives the seawater feed to the desired elevation.

The roof of the evaporation chamber helps define the productivity per unit of investment. The roof or cone 17 of the evaporative chamber 4 is preferably made of polycarbonate. In other embodiments, the roof of the still 4 is preferably made of other thin, vapor-impermeable and transparent material, allowing the development of a sharp thermal gradient between the vapor-filled inner volume of the still and the outside space. One examples includes a vapor barrier such as 3M™ Air and Vapor Barrier 3015; NASAT-ECH (6 Mil Reinforced Scrim) White/Foil (Waterproof) Vapor Barrier; Dura-Skrim® By Raven Engineered Films; Viper® Cs Polyethylene Vapor Barrier; Burke J. Vapor barrier films. The water-vapor barrier layer may be sandwiched between two layers of polyethylene or other transparent glass or thermoplastic material. One of these layers ends up on the inside surface of the finished laminate film and serves as a film-to-film heat-sealable adhesive.

In an especially preferred embodiment, the vapor barrier is a laminate comprising a film engineered to pass visible light without heating, but to trap the infrared radiation in the evaporation chamber (see Lozano L M, Hong S, Huang Y, Zandavi H, El Aoud Y A, Tsurimaki Y, Zhou J, Xu Y, Osgood R M, Chen G, Boriskina S V. Optical engineering of polymer materials and composites for simultaneous color and thermal management. Optical Materials Express. 2019 May 1; 9(5): 1990-2005; Zandavi S H, Huang Y, Ni G, Pang R, Osgood R M, Kamal P, Jain A, Chen G, Boriskina S V. Polymer metamaterial fabrics for personal radiative thermal management. InFrontiers in Optics 2017 Sep. 18 (pp. FM4D-6). Optical Society of America; Balocco C, Mercatelli L, Azzali N, Meucci M, Grazzini G. Experimental transmittance of polyethylene films in the solar and infrared wavelengths. Solar Energy. 2018 May 1; 165:199-205; each incorporated herein by reference in entirety).

A critical parameter of the process is the heat transfer coefficient on the roof 5 of the evaporative chamber 4. The heat transfer coefficient is important because it regulates the amount of heat leaving the system during water vapor condensation on the roof 5. This quantity is proportional to the enthalpy passed from the compressed refrigerant to the saline in the chamber 4. The removed enthalpy from the refrigerant in the evaporative chamber 4 translates into more cold post-expansion in the valve 6 and regulates the quantity of moist condensed in the unit 8 (where the expanded refrigerant evaporates). Thus, the amount of heat removed from the chamber 4 is directly proportional to the overall productivity of the installation in all segments of the thermal cycle. A rate-limiting step defines the value of the heat coefficient, which includes the step on the inside surface, the step across the barrier film and the step past the barrier film on the outside surface of the roof 5. Typically, either the heat conductance in the film itself or the heat transfer component on the outer side (into the ambient air) are the limiting, while the stage on the inner side is not.

Table 2 below presents the values of heat-transfer coefficients (See: https://www.engineersedge.com/heat_transfer/convective_heat_transfer_coefficients_13378.htm, incorporated herein by reference in entirety).

TABLE 2

The values of heat-transfer coefficients as a function of heat transfer mode and convection status.

| Flow type | K [W/m$^2$ × K] |
| --- | --- |
| Forced convection, airflow over a surface, low speed | 10 |
| Forced convection, airflow over a surface, moderate speed | 100 |
| Forced convection, moderate speed crossflow of air over a cylinder | 200 |
| Forced convection, the moderate flow of water in a pipe | 3000 |
| Forced conversion, molten metals | 2000-4500 |
| Forced convection, boiling water in a pipe | 50000 |
| Free convection, gases and dry vapor | 5-37 |
| Condensing water vapor | 5-100 |

Table 2 points to the role of the external gas flow under the conditions of forced convection. At low speeds, the heat transfer coefficient K is 10 W/m2×K but increases to 100 W/m2×K at the moderate velocities and to 200 W/m2×K in the crossflow conditions. The condensing water vapor situation shows a broadly variable range between 5 and 100 W/m2×K, determined by the density of the water vapor in the evaporative chamber 4, which is in turn dependent upon the durability and tightness of the barrier films, described above. The publication by Portnova N M, Smirnov Y B. "Heat transfer during condensation of steam from steam-gas mixtures in the passive safety systems of nuclear power plants" In Journal of Physics: Conference Series 2017 (Vol. 891, No. 1, p. 012125). IOP Publishing; incorporated herein by reference in its entirety discloses the data for heat-transfer by condensing steam in the presence of nitrogen, which closely models the regime in the evaporative chamber 4. The data of FIG. 1 and the formula (4) of Portnova et al. lead to the values ~400 W/m$^2$×K for the air-vapor mixtures in the mass fraction range 0.1-0.3 of water vapor.

The partial pressure of water vapor rises exponentially with temperature, which in turn is defined by the ratio of water flow to the heat flow available in the system (below). For example, the partial pressure of water vapor in equilibrium with the brine at 65° C. is ~0.25 atm, and at such vapor densities, the intensity of mass transfer is significant. Also, the vapor contacting the barrier film at a higher temperature and a higher steam fraction produce a higher driving force of heat exchange (temperature difference with the outside airflow), and this also facilitates condensation. Remarkably, for the steam at the temperatures 60° C., the desert air at 30-40° C. is a coolant and a simple Venturi device would leverage the energy of fan-driven flow to attract several more volumes of ambient air at the fixed proportion for more effective cooling. The condensate slides along the slanted surface of the roof barrier film and collects in an annular trough 19 of the evaporative chamber 4 (FIG. 2), before draining into the collector 3. While the increased temperature of the water is favorable for the mass and thermal transfer, excessively high temperature in the evaporative chamber 4 (>70° C.) is detrimental to the stability of the barrier film, will lead to deformation, leaks or sudden perforations by the pressure differences. These differences may arise when a significant portion of the steam suddenly condenses and produces a pressure difference that may rupture the heated barrier film. Such conditions can occur when colder water is injected in the evaporative chamber 4. In some embodiments, the evaporative chamber 4 features pressure sensors responding to such changes by equalizing the outer and inner pressure to avoid the rupture or damage of the barrier. This precaution is more relevant for highly productive solar stills operating at higher working temperatures and higher fractions of steam in the steam-air mixes.

In the preferred embodiments, the working seawater temperature is in the range 40-70° C., preferably 45-65° C., even more preferably between 50-60° C., and still more preferably between 52 and 56° C. At 56° C. the partial pressure of water vapor is 15% of atmospheric pressure which is still significant and corresponds to ~400 W/m²×K in the heat transfer coefficient on the vapor side. Under these conditions, the heat transfer on the outer side of the barrier is limiting.

The liquified refrigerant under pressure P2 proceeds to the expander 6. A basic refrigeration cycle consists of four major components: a compressor, a condenser, a metering device, and an evaporator. The cycle starts when refrigerant enters the compressor in a low-pressure, moderate-temperature, gaseous form. The compressor compresses the refrigerant to a high-pressure and high-temperature gaseous or liquid state. The high-pressure and high-temperature gas then enters the evaporative chamber in which the high-pressure and high-temperature gas is cooled to form a high-pressure liquid by transferring heat to a lower temperature medium (e.g., water vapor in the chamber 4).

To clarify, the compressed gaseous refrigerant entering the duct 27 in thermal contact with saline (FIG. 2) in the evaporation chamber 4 has higher temperatures than this saline, to ensure that heat flows from the refrigerant (which needs to lose enthalpy) into the brine. In turn, this heat facilitates evaporation and is released through the roof 5 when the distillate condenses (releasing the latent heat of condensation). Even when the brine in the chamber 4 gains temperature by absorbing waste heat, the temperature of the compressed refrigerant in the duct 27 is set to be still higher, to ensure the direction of the heat flow. After the refrigerant loses its excess enthalpy, including the latent heat of condensation in the duct 27, it is suitable for expansion in the valve 6, when it cools further by adiabatically expanding at a lower pressure and regenerating vapor phase. The latent heat of evaporation subtracts from the enthalpy of the entire refrigerant mass under the adiabatic condition in 6. The re-appearance of the vapor phase post-expansion is accompanied by the temperature drop (consider evaporation of diethyl ether on a skin surface, as a proper analogy). The final temperature of the refrigerant is lower than that of the ambient air and the cooled refrigerant absorbs the heat of humidity condensation in the unit 8 of FIG. 1. For the high-pressure liquid refrigerant to cool, the expansion valve reduces the pressure of refrigerant entering the valve 6, by restricting flow and allowing adiabatic expansion post-restriction.

Figure 4B:
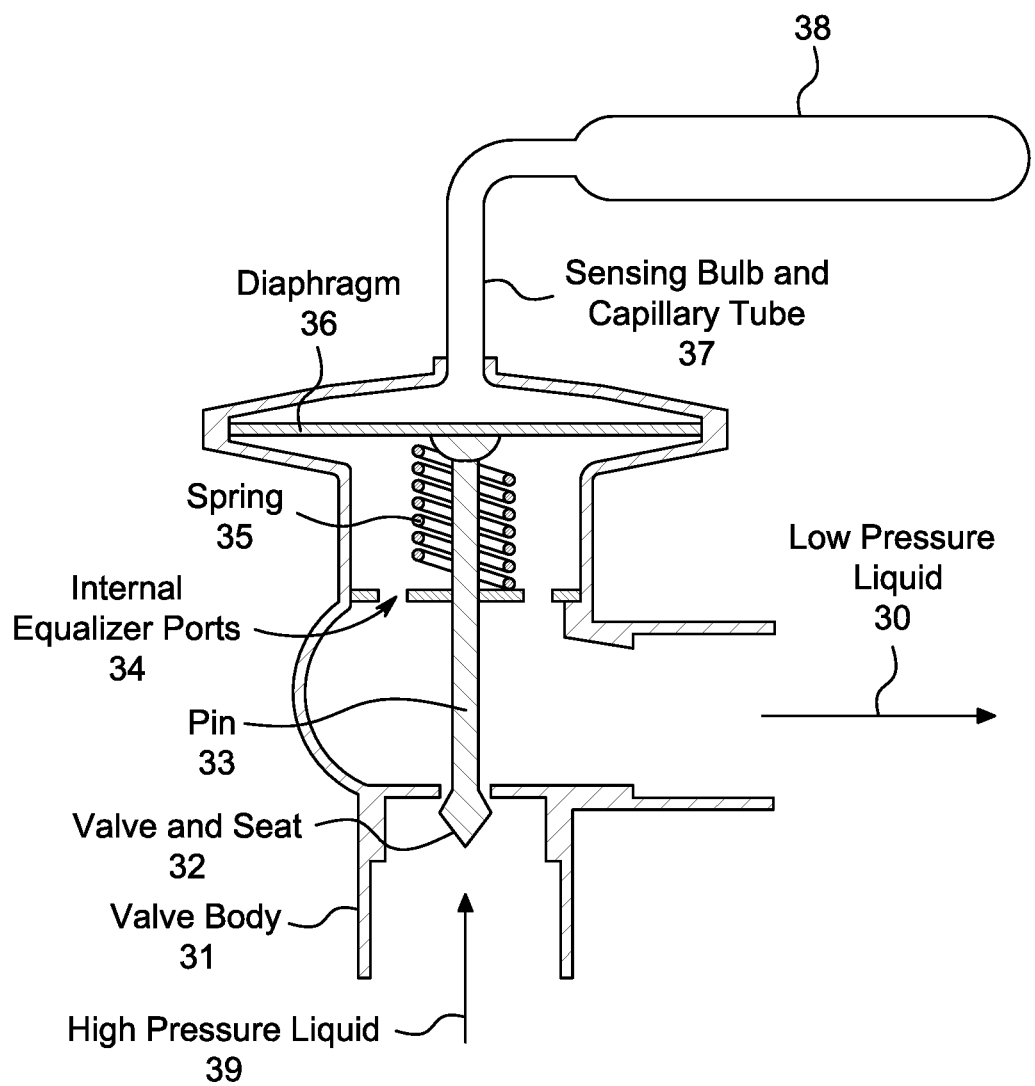
FIG. 4*b*: A scheme for a throttle expansion valve with negative feedback.

In a preferred embodiment, the expansion valve is a TXV expansion device (FIG. 4)

In a typical TXV scheme, the pressurized condensed liquid 29 turns into low-pressure liquid 30 by passing a narrow orifice with the opening regulated by the pin 33 entering the valve seat 32 encompassed by the valve body 31. A negative feedback system naturally supports the function of the valve. If the temperature is too high, the valve will open to allow more refrigerant to enter the downstream coil. If the temperature becomes low, the valve will throttle down the amount of coolant flowing into the coil 30. A TXV type expansion device has a sensing bulb 38 that is connected to the suction line of the refrigerant piping and senses the temperature of the refrigerant that leaves the evaporator (8 of FIG. 1 is an evaporator of the cooled expanded refrigerant). The gas pressure in the sensing bulb opens the TXV, adjusts the flow of coolant inside the unit 8 and, as a result, regulates the heat acquired by the refrigerant that exits the evaporator. The spring 35 by default pushes on the diaphragm 36 integrally connected to the pin 33, and the valve closes, decreasing the quantity of the expanded refrigerant delivered to the coil 30. The coolant gets overheated at the end of evaporator and increases the pressure in the sensing bulb 38. This increased pressure passes to the diaphragm 37, creating a force proportional to the product of the pressure by the area of the diaphragm. The corrective force acts against the default tension of the spring 35, pushing the valve 32 out of the opening in the body 31 and allowing more of the high-pressure liquified coolant from the segment 29 to evaporate in the low-pressure segment 30. With a higher mass flow of the coolant, the gas at the end of the evaporator 8 is less overheated, and the pressure on the diaphragm 37 diminishes, decreasing the amount of the expanded refrigerant. The realization of this feedback regulation is natural and does not depend on electronics.

In some embodiments, the expansion valves 6 of FIG. 1 are electronic expansion valves. Such devices are more preferred for larger systems or systems with multiple evaporators to allow them to be adjusted independently. Although electronic valves can provide wider control range and flexibility that bulb/diaphragm types cannot provide, they add complexity and points of failure to a system as they require additional temperature & pressure sensors and an electronic control circuit. Most electronic valves use a stepper motor hermetically sealed inside the valve to actuate a needle valve with a screw mechanism, on some units only the stepper rotor is within the hermetic body and is driven through the valve body by stator coils on the outside of the device. The TXV valve is the embodiment of choice for the inventive system.

At the lower pressure P3, a fraction of the condensed refrigerant evaporates and establishes a new equilibrium. Since the expansion is adiabatic (iso-entropic), the phase transition takes place by absorbing the internal energy of the refrigerant flow. The evaporation and temperature drop continues until the reverse process of condensation balances evaporation. The fraction of vaporized liquid can be found based on the system of equations:

$$Cp(T3-T4) = \theta \Delta Hevap \tag{7}$$

$$Ln\left(\frac{P3}{P2}\right) = -\left(\frac{\Delta Hevap}{R}\right)((1/T4) - (1/T3)) \tag{8}$$

Where P2 is the pressure before the throttle opening, P3 is the pressure downstream of the opening, θ is the fraction of the refrigerant flow evaporating post-opening, $\Delta H_{evap}$ is the latent enthalpy of evaporation for the refrigerant, T4 is the temperature post-opening, T3 is the temperature pre-opening, Cp is the heat capacity at the constant pressure P3, the equation (8) is the Clausius-Clapeyron relation. The final pressure P3 is an important optimization parameter, regulating the density of the vapor and the temperature of the vapor/liquid mix, typically with high heat-transfer coefficient in a broad pressure range. Depending on the degree of valve opening, either complete or partial evaporation is allowed in the post-expander segment. In a preferred embodiment, only partial evaporation takes place, and a significant share of liquid cooled refrigerant remains in the gas flow past the valve 31 into the stream 30 of FIG. 4. The benefit of this approach is to maximize the mass of the coolant transported through the cycle at the fixed quantity of compression work.

The expanded cold gas-liquid refrigerant mix thermally interacts in a counter-flow manner with the atmospheric water collector 8, actuated by the fan 9 in FIG. 1. The airflow and the gas-liquid refrigerant mix are separated from direct contact and mixing by the tube in which the gas-liquid refrigerant mix is conveyed through the evaporator 8. The airflow is preferably pre-purified from the dust and microbes by an electrostatic filter 10 and is driven by the fan 9 across the heat-exchanger, preferably in the form of a coil, that contains the expanded refrigerant. The lower the temperature T4 on the wall of the heat exchanger, the greater is the driving force for humidity condensation in the evaporator 8. For example, a well-expanded refrigerant can reach negative temperatures on the Celsius scale, while ambient air is mostly saturated at 40° C. The saturation partial pressure of water vapor is 0.06 atm at 40° C.; and 0.005 atm at 0° C. Practically, the circulating refrigerant may overheat if the throttle opening is too small. A larger orifice opening would result in more coolant at a somewhat higher temperature but is still more favorable overall due to greater mass flow. Decreasing the post-expansion temperature T4 below 0° C. adds little to the increase of condensed water yield from the air but begins to hinder the cooling of the system's segments more remote from the throttle (by decreasing the mass flow of the coolant).

In the preferred embodiments, the post-expansion temperature range for T4 is from −20 to +10° C., in a more preferred embodiment it is from −15 to +8° C., in a yet more preferred embodiment the desired range is −10 to +5° C., and in the most preferred embodiment the final temperature range of the condensing surface in 9 is −5 to 0° C. Raising the temperature T4 above 15° C. may be ineffective due to many days during a year with the temperatures below this limit, so that water vapor does not condense if the throttle opening is too wide.

In the process of contacting the heat-exchanger walls, not only the water vapor condenses but also the air itself is cooled, especially if the tubing surface is extensive. The cooled air passes along the roof 5 of the evaporation chamber 4 (FIG. 1), where the cooled air tangentially slides along the barrier film facilitating condensation of vapor inside the evaporation chamber 4.

In a preferable embodiment of the invention the fact the evaporator/atmospheric water collector 8 is directly adjacent to the evaporative still 4. In this embodiment the evaporator 8 and the evaporative still 4 share a common wall and both drain condensed water into the same potable water container. In FIG. 1 reference numerals 7 and 3 may represent a single reservoir that is connected both to the evaporator 8 and the evaporative still 4. One advantage of this embodiment is that cool air remaining after passage over the evaporation coil in the evaporator is directed to the roof of the evaporative still 4. In one particularly preferred embodiment the cool air from the evaporator 8 passes through a series of pipes or cavities that are embedded in the roof of the evaporative still 4. In this manner the efficiency of the evaporative still 4 may be increased resulting in the condensation and collection of greater amounts of potable water. Further in this embodiment, it is preferable that the expansion valve 6 is located inside the evaporator 8 such that the common wall separating the chamber in the evaporator 8 and the distillation chamber in the evaporative still 4 represents up to one fourth, preferably 1/8, preferably 1/16 the total surface area of the walls of the evaporator 8. It is further preferable that the wall separating the evaporator 8 and the evaporative still 4 is insulated to minimize conduction and passage of heat from the evaporative still 4 into the chamber of the evaporator 8. In essence, a significant temperature differential exists between the working temperatures inside the evaporative still 4 and the evaporator 8. Condensation in the evaporative still 4 occurs at a higher temperature than condensation in the evaporator 8. This temperature differential is preferably 20° C., 30° C., 40° C., 45° C., 50° C. or 55° C.

The heat transfer on the outer side of the barrier film (see the discussion above) is proportional to the tangential velocity of the cooling gas. By promoting a rate-limiting step, this tangential flow impacts the overall productivity of the evaporation chamber 4. In a preferred embodiment, the cooling flow from 8 to 4 proceeds in an outer duct between the outer surface of the barrier film (roof) 5 and a surface sheath located 4-5 cm above the barrier firm or roof of the evaporative chamber 4. The delimiting sheath can be made of thick 3-5 mm plastic such as polypropylene, polyethylene, polyamide, polyester, polystyrene without limiting. The heat conductivity of the cover/sheath is low and the entire volume of the cooled air moves in a turbulent regime with controlled mixing with the warmer ambient air, maintaining both the high driving force of heat exchange and maximized heat transfer coefficient in this arrangement. In night-time, when the fan is off, the sheath can be removed in some embodiments, and natural wind provides the cooling of the roof barrier film condensing the water vapor in the evaporation chamber 4.

In some embodiments, the cooled refrigerant emerging at valve 6 is split into two material flows. One proceeds to cool the humidity-saturated air, another proceeds to the photovoltaic battery and absorbs waste heated and/or trapped and passively accumulated heat. In a preferred embodiment, all coolant proceeds to the atmospheric water collector unit. Preferably the incoming seawater cools photovoltaic battery, as well as the pumps, compressor and fan. In such embodiments, either higher pressure P2 can be achieved post-compressor according to the formula (4), or a greater mass of refrigerant can circulate per the same electric power output of the solar generator and the same final pressure P2. These adjustments increase the freshwater yield per the same capital costs.

In another embodiment, the ratio of the saline mass to the mass of the rest of the system is high, enabling heat inertia. The saline circulates absorbing all sources of heat, including the heat from all parts of the system painted in black color to absorb the additional solar radiation and from the infrared radiation trapped under the barrier of the evaporative chamber 4. During the night-time, when the pumps and engines are off, the water continues to evaporate in the evaporative chamber 4, with the condensation facilitated by the cooler night breeze contacting the plastic roof barrier.

In some embodiments, the excess electric power is directed to the battery 11 in FIG. 1 and becomes re-used during night-time when the systems may function at a lower intensity or periodically. In some embodiments, the electric power from the grid supplements the power from the battery. In some embodiments, the hybrid water desalination station of the invention integrates with a diesel generator providing additional energy and waste heat during night-time.

In a preferred embodiment, the hybrid water desalination station is a larger plant, combined with an incineration plant that combusts for example oil residues, garbage, unusable waste. The primary heat of incineration drives the turbines providing electric energy in the grid, while the waste heat of combustion joins the solar heat in serving the large-scale heat pump cycle of the invention. For example, the saline water can be heated first by the components of the solar system and then by the components of the incineration plant. The evaporative chambers 4 can be placed in a sequence, and the cooled air driven by the fan 9 can serve multiple chambers facilitating water condensation in a counterflow manner.

The batteries suitable for storing excessive electric power produced by photovoltaics are exemplified, without limiting by: Koskela J, Rautiainen A, Järventausta P. Using electrical energy storage in residential buildings—Sizing of battery and photovoltaic panels based on electricity cost optimization. Applied Energy. 2019 Apr. 1; 239:1175-89; Vega-Garita V, Hanif A, Narayan N, Ramirez-Elizondo L, Bauer P. Journal of Power Sources. 2019 Oct. 31; 438:227011; Li J. Optimal sizing of grid-connected photovoltaic battery systems for residential houses in Australia. Renewable energy. 2019 Jun. 1; 136:1245-54; Li H X, Horan P, Luther M B, Ahmed™. Informed decision making of battery storage for solar-PV homes using smart meter data. Energy and Buildings. 2019 Sep. 1; 198:491-502; Mbungu N T, Bansal R C, Naidoo R. Smart energy coordination of a hybrid wind/PV with battery storage connected to grid. The Journal of Engineering. 2019 Aug. 19; 2019(18):5109-13; each incorporated herein by reference in its entirety. The specific examples of suitable batteries in conjunction with the solar panels are Li-ion type due to higher energy density than lead-acid, NiCd and NiMH batteries, as well as higher efficiencies vs the alternatives.

In some embodiments, the system utilizes waste heat of thermal power stations, using peat, coal, shale, dry wood, biomass unsuitable for other applications. In some embodiments, the process is carbon-neutral, using combustion of renewable sources such as fallen wood or foliage of the artificially planted forests. Other renewable sources are city sewage, animal farm manure, planned trimming of natural forests, sea algae.

In some embodiments, the approach incorporates an absorbing gel technology (See: Rezk H, Alsaman A S, Al-Dhaifallah M, Askalany A A, Abdelkareem M A, Nassef A M. Identifying optimal operating conditions of solar-driven silica gel-based adsorption desalination; Kabeel A E, Abdelgaied M. A new configuration of the desiccant dehumidifier with cut-segmental silica-gel baffles and water cooling for air conditioning coupled with HDH desalination system. International Journal of Refrigeration. 2019 Jul. 1; 103:155-62; Amirfakhraei A, Zarei T, Khorshidi J. Performance improvement of adsorption desalination system by applying mass and heat recovery processes. Thermal Science and Engineering Progress. 2020 Feb. 25:100516; all incorporated herein by reference in their entirety).

In these technologies, humid air contacts a silica gel column and becomes absorbed. The absorbed water dissociates by waste heat, producing vapor that condenses in the evaporator 8 of FIG. 1 yielding potable water. In a preferred embodiment, the humid air passes through a column with the silica-gel cooled by the expanded refrigerant post-valve 6, swelling it and cooling further. The silica-gel columns are paired, and while one absorbs atmospheric humidity, the other regenerates by evaporation. The column is heated by the waste heat that proceeds to warm the brine in the evaporation chamber 4 dissociating the bound water. The concentrated vapor contacts the cooled heat-exchanger in the atmospheric water collection unit and condenses. The silica-carrying columns alternate between saturation and regeneration.

A preferred super-absorbent gel embodiment exists for the conditions where the saline is not available. In this case, the inventive technology relies only on atmospheric moisture and offers functional autonomy to the users. In this embodiment, the superabsorbent gel is saturated by contacting the flow of night air, which is colder and thus the same content of water vapor is closer to saturation as compared to the daytime air. The gel resides in the evaporation chamber and is heated by the compressed refrigerant, dissociating the absorbed water (FIG. 4a, the red arrow means the compressed refrigerant in this embodiment, not the waste hot brine). The cooled refrigerant is expanded in 6 and further condenses the humidity in the air in 8. The gel absorbent/evaporator chamber pivots in the direction of the wind during the night, assisting the fan in pumping the increased volume of air through the gel chamber. This embodiment relies on solar energy and is suitable for open spaces.

Figure 5A:
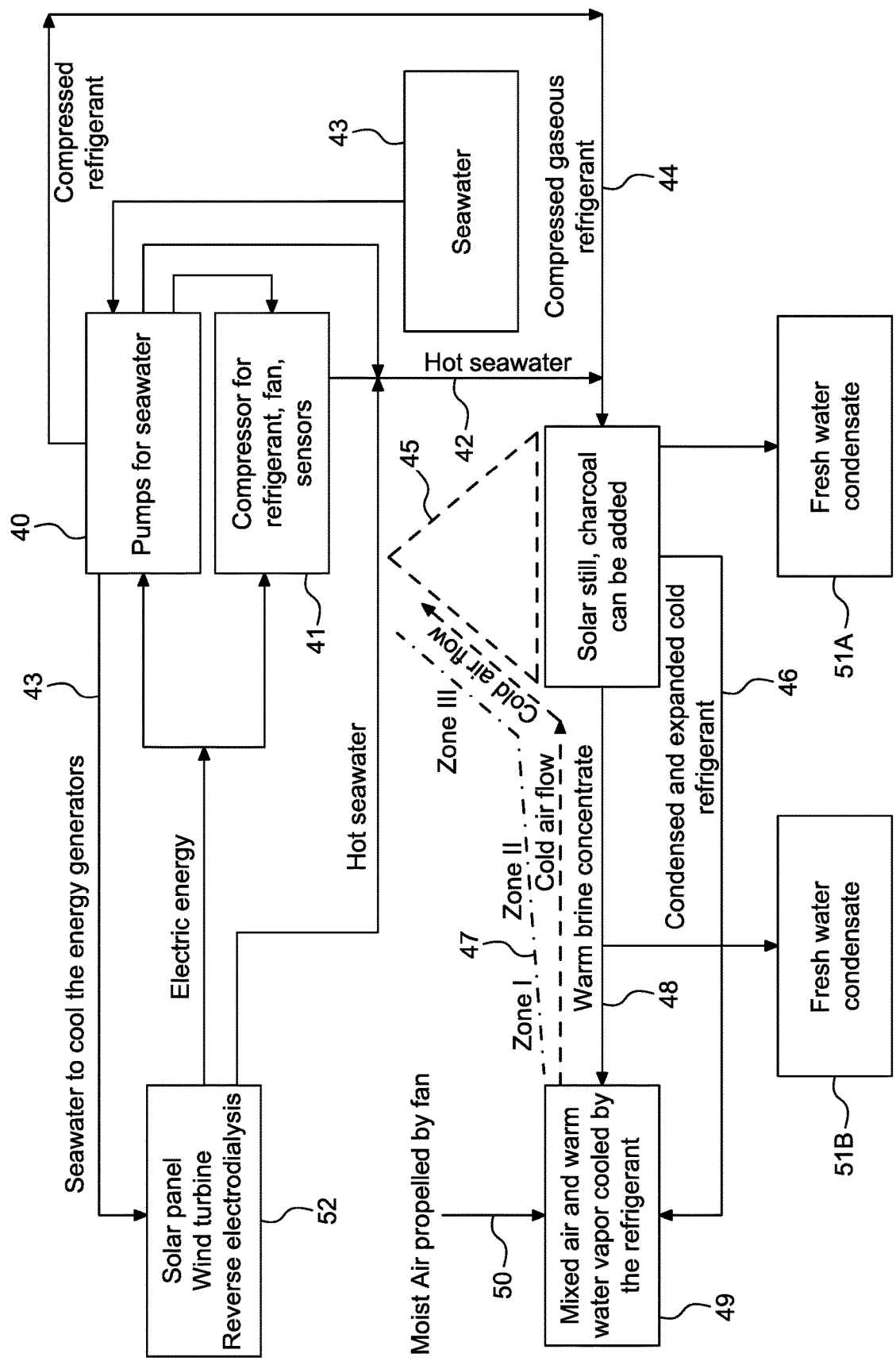
FIG. 5*a*: Re-use of enthalpy in a warm brine concentrate to humidify the atmospheric air before condensing added humidity by use of an expanded refrigerant and a cooled dehumidified air for facilitated condensation in the evaporator.

FIG. 5a presents the generic scheme of the method in the preferred embodiments with maximization of the freshwater production per unit of cost. Position 52 indicates the source of high-quality electric energy, such as photovoltaic cells, windmills, or reverse electrodialysis modules. The electrical energy powers the seawater pumps 40, compressor 41, fan 50, processor and sensors. The water passes the heat exchangers, cooling and improving the efficiency of the mechanical devices, while the enthalpy absorbed by the water flow translates in enhanced evaporation at a higher temperature in the chamber 45. The additional enthalpy can be gathered from the direct sunlight capture by the black paint and infrared trapping in the evaporation chamber 45.

The compressed refrigerant may contact the seawater stream 43 as an option in some embodiments. The compressed gaseous refrigerant enters the spiral duct 27 (FIG. 2) in the evaporative chamber 45 in contact with the warmed water 42. A conduit can be provided with the surface extensions, crests, grids or Raschig rings to maximize the rate of heat exchange. In the chamber 45, the refrigerant condenses while remaining at the same pressure. The evaporative chamber can accumulate energy by direct absorption of solar radiation through the transparent cone (in the visible range), while retaining infrared radiation behind the barrier similarly to overheating of a closed car. The presence of charcoal or carbon black accelerates the heating. Even after absorbing waste heat, the temperature of the saline is below that of the compressed refrigerant supporting the transport of heat away from the refrigerant into water, preparing for the deeper cooling downstream. The evaporative chamber 45 produces a vapor condensate (the target product, position 51A), a stream of brine concentrate at the temperature of the process (~60° C.) and a flow of condensed refrigerant 46.

The refrigerant 46 is then expanded in a throttle valve to form a mixture of the cold gaseous and liquid phases that function to dehumidify air.

The position 47 is subdivided into the zones I-III. The unit 47 is not identical to the evaporator 8 of FIG. 1, but the zone II aligns with the unit 8. The Zones I and III are functionally distinct from 8. In zone I, the warm brine concentrate fills a flat tray (see below) and contacts a stream of ambient air propelled by the fan (material flow 50). The incoming air is already partially saturated at sea level, but over the extended surface of the brine tray, the air reaches 100% moisture saturation (100% humidity). Warm humid air that contains brine droplets hits a barrier established across the flow (FIG. 5*c*) while the saturated air bypasses it by entering the zone II. In this zone, the pipe(s) carrying the expanded cooled refrigerant are in thermal contact with the air warmed and super-saturated with the vapor extracted from the warm brine concentrate. The outer pipe surfaces are further expanded by the grids, or fins or by the contact with Raschig rings. Virtually all humidity leaving zone I condenses in zone II and joins the condensate from the evaporative chamber 45 in the position 51B. Zone III represents a space formed by placing a rigid sheath in parallel to the film vapor barrier (dashed line in 45) forming the roof of the evaporation chamber. This sheath is a rigid screen that limits the movement of the cold air leaving zone II to tangential and turbulent motion along the vapor barrier length on both sides of the cone 17 (position 45 in FIG. 5*a*). More ambient air joins the fan-driven air by the Bernoulli equation effect (the fan-driven flow creates a low-pressure zone attracting the neighboring ambient air). In this regime, the cooled air passing over the evaporative chamber cone maintains a driving force for heat exchange as well as a high Reynolds number due to lower channel width and high linear velocity thereby causing turbulence along the surface of vapor barrier. The outer side of the evaporative chamber is rate-limiting in terms of the heat-transfer rate, the improvement of heat transfer in the rate-limiting position leads to condensation of more vapor in the evaporative chamber 45 and the unit 47.

Figure 5B:
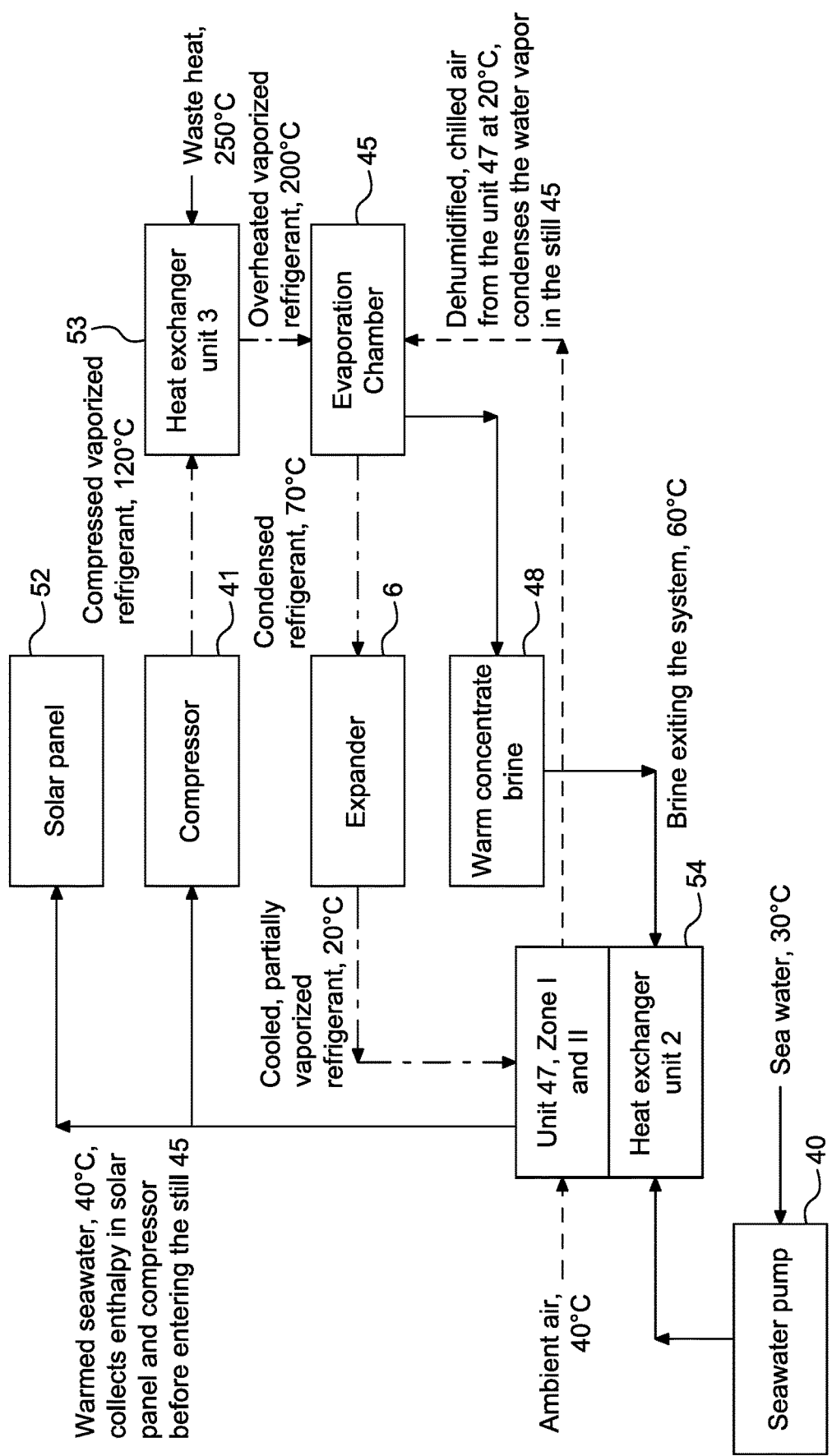
FIG. 5*b*: The use of an original seawater feed as a coolant and heat sink in an exemplary hybrid system.
Figure 5C:
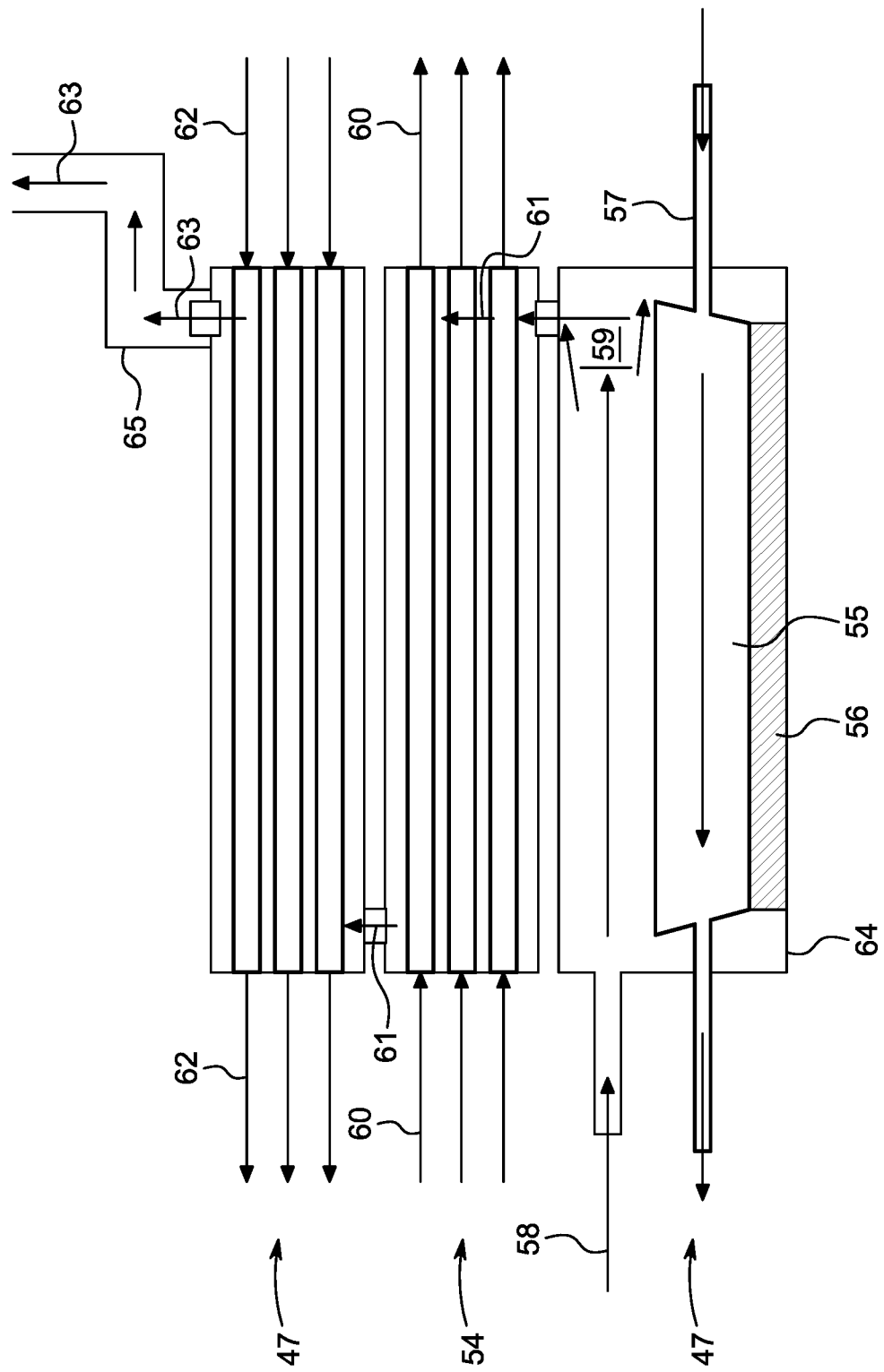
FIG. 5*c*: A scheme for a system including tandem atmospheric water collector and recycled water collector.

In FIG. 5*b*, the temperature of all processes is sufficiently high. Feed seawater near a coast (assumed to be at 30° C.) acts as a coolant and a heat sink of the cycle. The seawater is moved by the pump 40 into a contactor unit 54, where the seawater travels in the pipe loops exposed on the outer surface to the warm, humid air that forms in the trays of unit 47 (see the embodiment of FIG. 5*a*, zone I). The water evaporation in 47 follows the counterflow direct contact between the ambient air at 35-40° C. moved by the fan and the warmer brine concentrate at 60° C., leaving the evaporation chamber 45 and entering on the opposite side of the contactor 47 (FIG. 5*c*). At the end of the contact in zone I of 47, the air-vapor mix is at 55° C. due in part to a counterflow regime, laminar flows and elongated path of contact. On the opposite side of zone I, the cooled brine leaves the system at ~35° C. The brine cools by evaporating a fixed percentage of its mass in the fan-driven airflow until phase equilibrium establishes in 47. The warm air-vapor mix exits the saturating contactor 47 and enters the contactor 54 where the condensation heat of the water vapor at 55° C. is in part passed to the seawater at 30° C. The partially dehumidified airflow then leaves the contactor 54 and enters zone II of unit 47 where the rest of freshwater condensation takes place with any cooling capacity of the refrigerant expansion in the expander valve 6 that may remain. Thus, a higher flow of warm brine from the evaporative chamber 45 can be accommodated by the same amount of the expanded refrigerant and proportionally the units 47 and 54 yield a higher quantity of distillate per compression cycle.

The heated seawater leaving 47 and 54 and directed in the system for further distillation in 45 partially accepts the enthalpy of the exiting brine 48 and moves on to cool the solar panel 39 and compressor 41. The seawater may in some embodiments contact unit 53 (waste heat contactor) to further increase its enthalpy before entering the evaporation chamber 45 at ~60° C. This temperature is maintained throughout the evaporation chamber by mixing, wherein the heat removed by evaporation at the temperature 60° C. is equal to the heat received from the super-heated compressed refrigerant in contact with the saline water of the evaporation chamber 45.

The refrigerant flow enters the compressor in a gaseous state, becomes compressed and heated to ~90° C. and optionally enters the contactor 53, where waste heat source increases its temperature to 250° C. Such waste heat can be concentrated sunlight, diesel engine exhaust, the exhaust of a chemical plant, power plant, garbage incinerator or a refinery. The hot refrigerant after unit 53 thermally contacts warmed seawater in the evaporation chamber 45, increasing its temperature to 60° C., while contributing most of the heat to evaporation of water steam. The refrigerant cools from 250 to 70° C., condenses at 70° C. and is expanded in unit 6. The cooled and expanded coolant enters unit 47 where it facilitates condensation of some of water vapor, while also cooling the remaining air component of the steam-air mix. The dehumidified and chilled air component at 20° C. facilitates rapid vapor condensation in the evaporative chamber 45, entering Zone III of the position 47 as described above. Thus, the additional enthalpy entering with the waste heat in unit 53 contributes to evaporation and the waste heat is removed by the cooling seawater feed in unit 54. The increased yield of distillate is proportional to the overall enthalpy flow in the apparatus. The flows that leave the system are the brine concentrate and dehumidified air, both at the ambient temperature. Almost all energy that entered the inventive cycle is consumed in the water distillation, minus the radiated components and some small quantity in the departing distillate. A significant part of the invested solar and axillary energy may still be present in the altitude (gravitational energy) of the concentrated brine and its increased salinity. The possibility of energy recuperation from these components was discussed above and becomes relevant for the large-scale integrated distillation plants, to cut the equipment and energy costs.

FIG. 5*c* presents integrated units 47 and 54 in more detail. Together they form an atmospheric water collector coupled with a recuperated water collector. The material flow 48 represents the warm concentrated brine leaving the evaporation chamber 45 at 60° C. The enthalpy of the brine needs to be recuperated, and the evaporating steam and ambient air absorb it. Zone I of unit 47 comprises a tray 55 installed in the chamber 64 and thermally insulated from below by a foam stand 56. The exemplary dimensions of the tray are 5 cm depth, 0.5 m width and 2 m length, without limiting. Such dimensions facilitate rapid evaporation and establishment of a stationary state. The distillate forming in this unit collects below the stand 56 and is drained into a distillate collection tank (not shown). Ambient air 58 enters the apparatus at the typical temperature 30-35° C. and moves over the tray in a laminar regime avoiding the capture of saline droplets. In the process of moving over the tray, the airflow is warmed and saturated with the equilibrium humidity. The warmed brine 48 also moves in a slow laminar regime along the tray and passes its excessive enthalpy to the warmed air 58 at its final temperature and the additional quantity of evaporated steam results from heating the air 58 in contact with the brine 48 from its initial to the final temperature. Zone I operates in the regime of counterflow. Air leaving zone I is at the maximal temperature approaching the temperature of the entering saline (50-55° C. range for the air). The airflow encounters the shield 59 and deposits the droplets of the saline accidentally entrained in zone I, although the probability of this entrainment is minimized by the laminar regime in the counterparts, maintaining the piston flow of the air and saline, just enough to capture and remove water vapor.

The partially dehumidified air enters 54 as material flow 61. The stream 60 is the initial seawater moving in counterflow to the humidified air and accepting its enthalpy while condensing a fraction of the humidity absorbed at the prior stage. The condensate leaves the unit by the force of gravity and flows in the collection tank (not shown). The saline and air phases are separated by the pipe walls and can be used in combination with turbulent regimes to maximize mass and heat exchange. The seawater feed stream 60 further enters the cooling envelopes of the pump, photovoltaic generator, and compressor. In other embodiments, the stream 60 mediates the cooling of these system components through a heat exchanger, while the refrigerant provides direct thermal contact between these components. The intermediate refrigerant is cooled by the saline feed 60 and enters the compressor at a lower temperature, enabling better compression efficiency.

Stream 61 entering zone II of 47 is the partially dehumidified air leaving the unit 54. This air contacts the pipes that carry the expanded refrigerant 62 receiving the excess latent heat of condensation of the residual moist in zone II and cooling the airflow 63 leaving zone II for zone III. The flow 63 entering zone III is the dry cooled air after zone II of unit 47. Zone III is tangential to the evaporation chamber 45 and runs in parallel to the rigid sheath 65 providing the boundary to zone III. Between 45 and 64 the air moves in a turbulent ideal mixing regime, facilitating removal of the excessive heat of condensation on the distillation roof barrier of the evaporation chamber 45.

Sensors and Regulation

Figures 6, 7A:
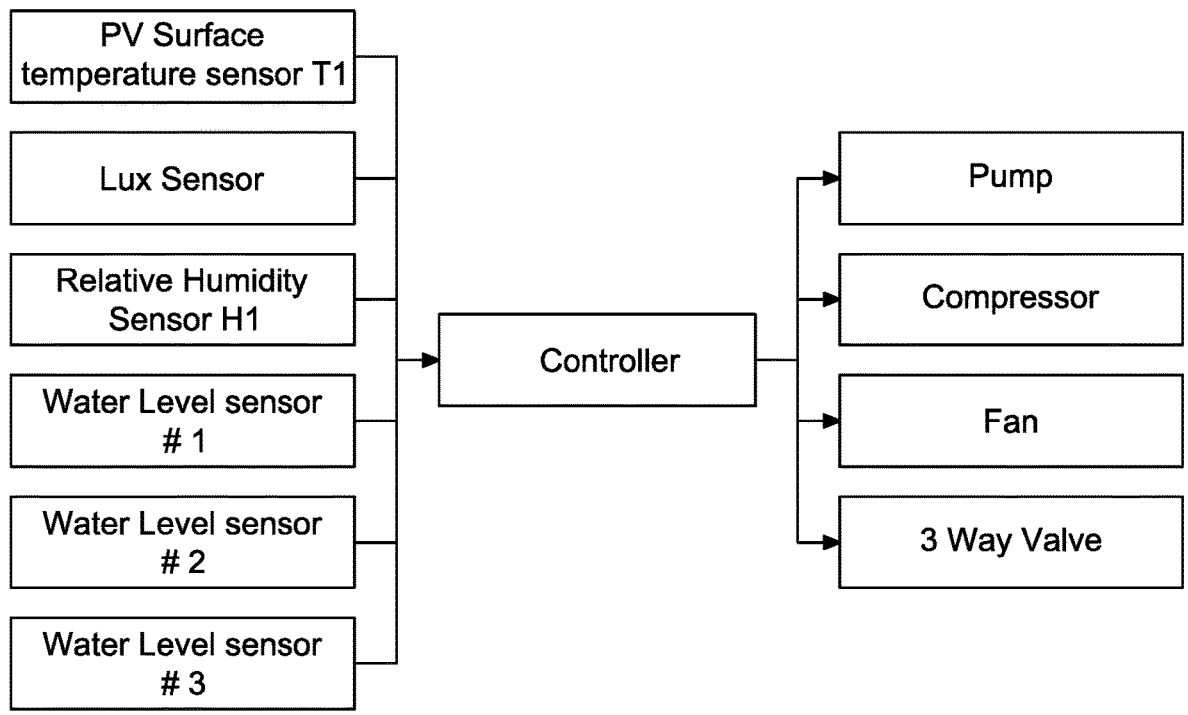
FIG. 6: A system's control scheme.
FIG. 7*a*: Pseudocode for pump control conditions.

FIG. 6 shows the coordination of different systems by a processor. Level meters control the levels of distillates and seawater in the positions 43, 45, 47, 49, 51 of FIG. 5a.

The class of sensors suitable for detection of the levels in the manometers is termed "level sensors". Level sensors detect the level of liquids and other fluids and fluidized solids, including slurries, granular materials, and powders. Substances that flow become essentially horizontal in their containers (or other physical boundaries) because of gravity whereas most bulk solids pile at an angle of repose to a peak. The substance to be measured can be inside a container or can be in its natural form (e.g., a river or a lake). The level measurement can be either continuous or point values. Continuous level sensors measure level within a specified range and determine the exact amount of substance in a certain place, while point-level sensors only indicate whether the substance is above or below the sensing point. Generally, the latter detect levels that are excessively high or low (see Henry Hopper, "A Dozen Ways to Measure Fluid Level and How They Work," Dec. 1, 2018, Sensors Magazine, retrieved May 19, 2020, incorporated herein by reference in its entirety).

Typical systems for point level detection in liquids include magnetic and mechanical floats, pressure sensors, electroconductive sensing or electrostatic (capacitance or inductance) detectors—and by measurement of a signal's time-of-flight to the fluid surface, through electromagnetic (such as magnetostrictive), ultrasonic, radar or optical sensors. Continuous level sensors relay the exact level of a tank or vessel at any point, over a full span of measurement. This sensing mode is most often used for process control or any application when absolute precision and accuracy are of crucial importance, and such precision is required for the inventive method. Manufacturers such as Drexelbrook provide a broad range of continuous level sensors. The company produces the level sensing devices based on the principles of RF admittance, ultrasonic, open-air radar, guided wave radar, magnetostriction.

In a preferred embodiment, a video-camera with high resolution/pixilation characteristics (5000×5000 per $cm^2$) can be installed in a defined position (see Petrov I. Raspberry Pi based System for Visual Detection of Fluid Level. Capstone thesis project, Tallinn University of Technology. 2014; Chakravarthy S, Sharma R, Kasturi R. Non-contact level sensing technique using computer vision. IEEE transactions on Instrumentation and measurement. 2002 Aug. 7; 51(2):353-61; Chandani S M, Jaeger N A. Optical fiber-based liquid level sensor. Optical Engineering. 2007 November; 46(11):114401; Singh H K, Chakroborty S K, Talukdar H, Singh N M, Bezboruah T. A new non-intrusive optical technique to measure transparent liquid level and volume. IEEE Sensors Journal. 2010 Sep. 23; 11(2):391-8; Ritterbusch K, Junginger S, Thurow K. Camera grids for laboratory automation. In 2012 IEEE International Instrumentation and Measurement Technology Conference Proceedings 2012 May 13 (pp. 1352-1357). IEEE; each incorporated herein by reference in entirety).

Another group of sensors are manometers used to measure the pressure in the pipe segments after the compression and before the expander valve 6 and after the expander and before the compressor of FIG. 1. Such sensors are typically pre-installed in the compressor: high-pressure transducers and low-pressure transducers are installed in the HVAC compressor to control and optimize the cycle. Exemplary meters include WIKA R-1 pressure transducers (https://www.wika.us/); the MIP Series by Honeywell (https://sensing.honeywell.com/honeywell-sensing-mip-series-hvacr); pressure controllers by MENSOR (https://www.mensor.com); the PX series pressure transducers by OMEGA (https://www.omega.com/en-us/sensors-and-sensing-equipment/pressure-and-strain/c/pressure-transducer); Alpha Instrument transducers for the differential pressure measurements (https://alphainstruments.com/low-differential-pressure-transducers-transmitters/). Other manufacturers comprise PCB Piezotronics; Dunan Sensing; Euromisure; TE Connectivity; CAREL pressure transducer each incorporated herein by reference without limiting.

Still another group of meters are thermometers. As a preferred embodiment, thermocouples can be installed throughout the entire length of the circuit and on all material flows. The exemplary positions are, in terms of FIG. 5a: before and after 40 in the seawater entering the pump from the source and cooling the pump (can be the same flow); seawater entering and leaving the evaporation chamber 45; seawater entering and leaving the cooling tubing of the compressor and photovoltaic cell; brine concentrate leaving the system in the positions 48 and 49. The temperature of the refrigerant can be controlled post-expansion in the position 46; at the entry and at the exit of the compressor 41; the refrigerant temperature that establishes during condensation in the still 45; and post-interaction with the super-saturated airflow in the position 47. Non-limiting examples of the thermocouples associated with HVAC cycles are Digital 2 k-type Thermocouple Thermometer DM6802 for HVAC, Furnace, Heater; Thermocouple Air Temperature Sensor—HVAC—PPL9-T; HvacPartsShop.com (https://www.hvacpartsshop.com/furnace-parts/thermocouples/); Fieldpiece K-Type Thermocouples by TruTech Tools (https://www.trutechtools.com/TypeK); each incorporated herein by reference without limiting.

In an alternative embodiment, optic fiber sensors are used for temperature measurements, exemplified by the products of sensuron.com; TS Temperature Sensors by Micronor; Advanced Energy's Luxtron Fiber Optic Temperature Sensors; Neoptix Fiber Optic Temperature Sensors; Opsens Solutions' fiber optic temperature sensor; Althen Sensors; the fiber-optic sensors by Rugged Monitoring; each incorporated herein by reference without limiting. The principle of operation is based on the temperature dependence of the bandgap of GaAs. The GaAs crystal fixed on the tip of the fiber will be transparent at a wavelength above 850 nm. The position of the band edge is temperature-dependent and is shifted about 0.4 nm/K. The light is directed via the optical fiber to the crystal, where it is absorbed and partially reflected back into the fiber. A miniature spectrometer provides a spectrum with the position of the band edge, from which the temperature is calculated. Fiber optic temperature probes are designed to withstand harsh and corrosive environments.

Yet another group of meters are psychrometers and hygrometers, measuring the humidity content in the airflows. Alternatively, the humidity content can be assumed to be a function of temperature and saturation, which is near 100% or even above (super-saturation). At least one relative humidity sensor measures the humidity content of the air in the embodiment of FIG. 1 (no utilization of the warmed concentrate leaving the solar still, the ambient air is the only source of humidity driven by the fan 9). The non-limiting examples of such instruments are The Air Humidity Meter PCE-TH 5 by PCE Instruments, Vaisala HUMICAP® Humidity and Temperature Probe HMP4; Outside Air Humidity. & Temperature Sensor. Model HU-227 by Kele; NIR Humidity are Sensors by Humidity.

For applications where cost, space, or fragility are relevant, electronic humidity sensors are used. In capacitive hygrometers, the effect of humidity on the dielectric constant of a polymer or metal oxide material is measured. With calibration, these sensors have an accuracy of ±2% RH in the range 5-95% RH. Capacitive sensors are robust against effects such as condensation and temporary high temperatures. Capacitive sensors are subject to contamination, drift and ageing effects, but they are suitable for many applications.

Resistive hygrometers measure the change in electrical resistance of a material due to humidity. Typical materials are salts and conductive polymers. Resistive sensors are less sensitive than capacitive sensors—the change in material properties is less, so they require more complex circuitry. The material properties also tend to depend both on humidity and temperature, which means in practice that the sensor must be combined with a temperature sensor. The accuracy and robustness against condensation vary depending on the chosen resistive material. Robust, condensation-resistant sensors exist with an accuracy of up to ±3% RH (relative humidity).

In thermal hygrometers, the change in thermal conductivity of air due to humidity is measured. These sensors measure absolute humidity rather than relative humidity, but the relative values can also be computed knowing the temperature.

An optical hygrometer measures the absorption of light by water in the air. A light emitter and a light detector are arranged with a volume of air between them. The attenuation of the light, as seen by the detector, indicates the humidity, according to the Beer-Lambert law. Types include the Lyman-alpha hygrometer (using Lyman-alpha light emitted by hydrogen), the krypton hygrometer (using 123.58 nm light emitted by krypton), and the differential absorption hygrometer (using light emitted by two lasers operating at different wavelengths, one absorbed by humidity and the other not). (see D. K. Roveti. Choosing a Humidity Sensor: A Review of Three Technologies. Sensors Magazine (2001); Wexler, Arnold; Hyland, Richard W. (May 1, 1964). "The NBS standard hygrometer". www.nist.gov. National Bureau of Standards. Retrieved Jul. 21, 2017; Makkonen, L., Laakso, T (2005) Humidity measurements in cold and humid environments. Boundary-Layer Meteorology, 116: 131-147, doi 10.1007/s10546-004-7955-y; each incorporated herein by reference in its entirety).

Lux meters are used for measuring brightness in lux, fc or $cd/m^2$. Some lux meters are equipped with an internal memory or data logger to record and save measurements. The importance of this measurement increases if the battery 11 in FIG. 1 has a low resource or cannot be charged by grid power, wind power or diesel generator power. In these cases, the performance relies entirely on solar light availability and needs to adjust to the change in conditions. The non-limiting examples of the Lux sensors suitable for the inventive applications are Lux Meter by PCE Instruments; Adafruit 4162 VEML7700 Lux Sensor; Flora TSL2561 Lux Sensor; Belimo Outdoor Light (Lux) Sensor 0-10V; Illuminance Sensors LUX Sensor—ML-0205-0/ML-0205-I; all incorporated herein by reference in entirety.

The sensors and the major system's components are linked to a processor (FIG. 6). In a preferred embodiment, and without limiting, the controller is customized and assembled on an Arduino template (see Selker A, Drake S A, Selker J S. A Portable Streambed Permeameter Built With 3-D Printed and Arduino Controller/Data-Logger. In AGU Fall Meeting Abstracts 2014 December; Rodriguez-Juárez P, Júnez-Ferreira H E, González Trinidad J, Zavala M, Burnes-Rudecino S, Bautista-Capetillo C. Automated Laboratory Infiltrometer to Estimate Saturated Hydraulic Conductivity Using an Arduino Microcontroller Board. Water. 2018 December; 10(12):1867; Spinelli G M, Gottesman Z L, Deenik J. A low-cost Arduino-based datalogger with cellular modem and FTP communication for irrigation water use monitoring to enable access to CropManage. HardwareX. 2019 Oct. 1; 6:e00066; each incorporated by reference in its entirety). The Arduino-compatible processors are Arduino UNO R3 and the Arduino Mega 2560 processors, without limiting and mentioned solely as illustrating examples.

FIG. 7*a* presents the feedback loop for the control of the freshwater level in the tank 51 of FIG. 5*a* or tanks 3, 7 in FIG. 1. If the tank overfills, the installation turns off or the freshwater returns to the evaporation chamber. The pump trafficking the freshwater in its final reservoirs can be switched off. FIG. 7*b* reflects regulatory feedback when the compressor turns off as a function of the level in the freshwater tank. When the level is low, the system activates the compressor and in proportion to this input (by the factor of COP) the freshwater is produced. When the level approaches the capacity of the tank, the compressor turns off, the production rate decreases reaching the zero value at the target time. FIG. 7c illustrates the flexibility that exists in the disposal of the cooled refrigerant post-expansion. When the humidity level in the ambient air is low, the fan is turns off, and no refrigerant enters in the respective circuit (position 8 in FIG. 1 or position 47 in FIG. 5a). More refrigerant is directed to the photovoltaic cell, improving its cooling, and allowing greater electric power production (which can be used to recharge the battery). Also, more refrigerant is directed to the compressor and pump, intensifying vapor production in the still 4. It is assumed that with the fan shutdown, the ambient wind provides the tangential velocity sufficient to assume the latent heat of condensation on the vapor barrier in the cone of the still 4 (FIG. 1). The LUX sensors on PV allow predicting the electric energy output accompanied by waste heat production. While the embodiments of FIG. 5 envisage the use of seawater feed for cooling of the photovoltaic cell (PV), the embodiments of FIG. 1 do not include this option. Therefore, the distribution of the coolant forming in the expansion three-way valve 6 in favor of the PV and other system's components needs optimization. In case of low radiation, the pump and compressor can continue functioning on the power stored in the battery, and there is no need to direct the coolant in the photovoltaic battery circuit. Instead, it redistributes between the air cooling and compressor/pump cooling.

The system may be optimized for ratio of fresh-water produced per the unit of capital costs. The energy costs are moderate in regions with high solar activity and rich in hydrocarbon resources. The cost of 1 kWh of energy is 8 cents in India and China, 10 cents in Canada, 11 cents in Russia and 12 cents in the USA.

Assuming the COP=5, 5 volumes of water are evaporated in the chamber 4 and condensed out of the ambient air per one equivalent of the grid-quality energy invested in the system. However, waste heat, re-used heat, and passive heat of the sun trapped in the still and absorbed by the black painting of the piping can lower the cost. Thus, passing the circulation piping in the hot sand, soil, gravel or asphalt around the evaporation chamber 45 would utilize this thermal energy and accumulate it in the mass of brine (not less than 10 tons) during the day and early evening. The temperature of desert sand and rock averages 16 to 22° C. (30 to 40° F.) more than that of the air. For instance, when the air temperature is 43° C. (110° F.), the sand temperature may be >60° C. (140° F.). The circulation shuts down when the soil/sand/gravel/asphalt cools during late evening and night, and the process of condensation continues by inertia converting the enthalpy of hot brine in the latent heat of vaporization. Assuming the latent heat of evaporation to be $2.2 \times 10^6$ joules/kg, while the heat capacity of water to be $4.1 \times 10^3$ joules/kg×K, cooling of 10 tons of the brine from 60° C. in the early evening to 30° C. in the early morning corresponds to evaporation of 600 kg of water under the ideal conditions. The use of heat-trapping infrared-reflecting film as a component in the roof laminate further enhances this embodiment. This parallel passive mode of using the same equipment as intended for the active heat pump process directly impacts the affordability (Example 3) in competition with more high-tech processes such as reverse osmosis. The inventive method is more versatile and advantageous than the benchmarks in this regard (see the embodiments below). Considering the ratio of 1:5 for the electric power yield and waste heat in PV, as well as the ratio of 1:0.5 between the PV and non-PV sources of waste heat, the corrected COP increases to ~7.5.

The cost of evaporating 1 m³ of water only using high-quality grid-level energy is:

$$\text{COST} = 41 \text{ kJ/mol} \times [1000 \text{ kg}/0.018 \text{ kg}] \times 0.056 \text{ US dollars}/3.6 \times 10^6 \text{ J} = \$35.43/m3$$

Considering the inherent high COP of heat pumps and the use of waste heat as disclosed in the embodiment of FIG. 5a-c, the energy cost falls to ~$5/m³, assuming an advantageous desalination plant location. The consumption per person is ~200 L of freshwater a day in Saudi Arabia, therefore the energy costs at $1 per day or $365 per year per person are acceptable. Water supply at this expense range is sufficient to support hydroponics agriculture, where the recovered freshwater is delivered to the plant roots in the carefully prepared non-leaking beds allowing lateral seeping of the irrigation moist, but not absorption in depth. The hydroponic agricultural complexes in the desert conditions need to be cooled by air conditioning, and the desalination cycle can be coupled to the waste heat removed by these large-scale HVAC systems. For example, the waste heat emitted from the agricultural complex HVAC can heat or re-heat the refrigerant flow post-compressor and this excessive enthalpy will translate into more evaporation in the evaporation chamber 4 or 45.

The cost of equipment is higher. Solar photovoltaics in combination with lithium-ion battery at the residential (0.39 to 0.77 EUR/kWh) and utility scale (0.17 to 0.36 EUR/kWh) as well as with pumped hydro storage at the bulk scale (0.13 to 0.18 EUR/kWh) offer the lowest levelized costs (see: Gupta R, Soini M C, Patel M K, Parra D. Levelized cost of solar photovoltaics and wind supported by storage technologies to supply firm electricity. Journal of Energy Storage. 2020 Feb. 1; 27:101027; incorporated herein by reference in entirety). The levelized cost of energy (LCOE), or levelized cost of electricity, is a measure of the average net present cost of electricity generation for a generating plant over its lifetime. The LCOE is calculated as the ratio between all the discounted costs over the lifetime of an electricity generating plant divided by a discounted sum of the actual energy amounts delivered. The LCOE is used to compare different methods of electricity generation on a consistent basis. The LCOE represents the average revenue per unit of electricity generated that would be required to recover the costs of building and to operate a generating plant during an assumed financial life and duty cycle. Inputs to LCOE are chosen by the estimator. They can include the cost of capital, fuel costs, fixed and variable operations and maintenance costs, financing costs, and an assumed utilization rate.

The production of 1 m³ of distillate involves evaporation of ~100 L of the total by high-quality grid energy (considering COP in the range 5-7.5, estimated in the prior discussion for some of the embodiments, and production of distillate in all processes further magnifying the equivalent COP) and the rest being evaporated by waste heat. The minimal levelized costs are estimated as:

$$\text{COST LEVELIZED} = (150/0.018 \text{ moles}) \times (41000 \text{ J/mol}) \times (1/3.6 \times 10^6 \text{ joules/kWh}) \times \text{LCOE} = \$14/m^3.$$

This estimate is obtained at the assumption of 0.13 EUR/kWh LCOE and effective COP=7.5. Assuming 0.77 EUR/kWh and effective COP=5, obtain $124/m³, or $25/day or $9,125 per year on the upper boundary of the range. These levelized capital expenses exceed the energy expenses by orders of magnitude under the same assumptions and point at the need of improving the distillate yield per a unit of capital investment. Furthermore, the costs above included only photovoltaic cell, while the HVAC, fan, still, tubing, heat exchangers, sensors and processor costs need to be taken into consideration, assuming doubling of PV-only costs (other components are standard and low tech). The expenses at ~$18,000/year per a person is the estimate at the higher end of the range and are more compatible with the embodiment of FIG. 1 (flexible residential-scale regime), while the expenses in the embodiment of FIG. 5a-c practiced at larger industrial scale are in the range of $2,000 per person per year. The freshwater is distributed by cars, ships and trains from the centers of production, adding to the costs in the embodiment of FIG. 5a-c, while the PV cells of FIG. 1 can be embedded in the roofs of the buildings and can be subsidized by lower mortgage interests. Even at the lower range, the distillate yield ratio per the equipment cost requires maximization to make the inventive technology fully affordable to the general population.

Table 3 below presents the list of factors that impact the productivity to the equipment cost ratio. The embodiment of FIG. 5a-c is assumed.

TABLE 3

Factors determining economic efficiency.

| # | Factors |
|---|---------|
| 1 | The temperature of the saline in the solar still is measured |
| 2 | The accelerated ambient air contacts the concentrated brine and is super-saturated by humidity. Humidity level is measured. |
| 3 | The incoming saline water cools the compression, the temperature of the water before and after the compressor is measured. |
| 4 | The incoming saline water cools the photovoltaic battery, the temperature of the water before and after the battery is measured. |
| 5 | The incoming saline water cools the pump, the temperature of the water before and after the pump is measured. |
| 6 | The refrigerant mass in the circuit is measured. |
| 7 | The refrigerant temperature pre-compressor is measured. |
| 8 | The refrigerant pressure pre-compressor is measured |
| 9 | The refrigerant temperature post-compressor is measured |
| 10 | The refrigerant pressure post-compressor is measured. |
| 11 | The refrigerant temperature post-expansion is measured |
| 12 | The refrigerant pressure post-expansion is measured |
| 13 | The ambient air humidity is measured |
| 14 | The ambient airflow is defined |
| 15 | The ambient air temperature is measured |
| 16 | The fraction of seawater to evaporate is defined |
| 17 | The volume of the brine to enter the system is defined |
| 18 | The temperature of the brine to leave the system is defined |
| 19 | The width of the spacing between the vapor barrier in the still 45 of FIG. 5a,, 5b and the outer barrier constraining the cold airflow in the zone III is defined. |
| 20 | The wattage consumed by the compressor is defined |
| 21 | The number of rotations of the compressor turbine is defined |

In one embodiment, the optimization method is a regression model. The processor is set to detect the levels of freshwater in the collection tanks each 15 min, while at the same time measure the factors 1-21 of the Table 3 by the respective sensors. Every 4-6 hours the controller would introduce small 1-5% variations in the factors selected randomly out of the 21 total and continue data collection. After 2-3 days in this regime, all factors are perturbed, and the corresponding rate of distillate accumulation is available for each variation. A multiple regression model is run to extract the independent effects of each factor in the presence of the rest. The non-limiting examples of the software providing such capability are MATLAB, LINEST (attachment to Microsoft Excel), SPSS, Regresslt (https://regressit.com, attachment to Microsoft Excel), Statistica, Statgraphics, STATA.

After running the first iteration, the regression model indicates the positive factors (increasing the productivity) and the negative factors (decreasing the productivity), reporting the statistical power of each signal as a ratio of the regression coefficient to the standard deviation of the factor. These ratios provide the natural weights to increment the positive and negative factors and define a new regime to test the next 2-3 days. Over a period of several weeks, the installation reaches its maximal possible productivity.

Having generally described this disclosure, a further understanding can be obtained by reference to certain specific examples which are provided herein for purposes of illustration only and are not intended to be limiting unless otherwise specified.

Example 1: Computation of the Equivalent Cop and Production Costs in the Absence of Additional Sources of Waste Heat "Equivalent COP" is defined as the ratio of the distillate produced using all sources of energy in the inventive system to the distillate produced using the heat equivalent of the mechanical work of compression. With the sources of waste heat available freely, the equivalent COP provides a metric linking the levelized capital expenses per a photovoltaic battery to the distillate productivity and cost of production.

Assuming the compression work delivered to the refrigerant as 1 kWh ($3.6 \times 10^6$ joules), the useful electric output of the photovoltaic battery is 2 kWh, considering the losses in the compressor and other inefficiencies. The expenditure of 0.6-0.9 kWh of energy per one ton of generated coolant is a realistic goal for heat pumps (see: Chua K J, Chou S K, Yang W M, Yan J. Achieving better energy-efficient air conditioning—a review of technologies and strategies. Applied Energy. 2013 Apr. 1; 104:87-104, incorporated herein by reference in entirety). The efficiency of air conditioners is often rated by the seasonal energy efficiency ratio (SEER) which is defined by the Air Conditioning, Heating, and Refrigeration Institute in its 2008 standard AHRI 210/240, Performance Rating of Unitary Air-Conditioning and Air-Source Heat Pump Equipment. A similar standard is the European seasonal energy efficiency ratio (ESEER). While the Carnot theorem limits the maximal SEER and COP, of interest are the practically observed values in the actual apparatuses. Today there are mini-split (ductless) air conditioner units available with SEER ratings up to 42 (See: "Carrier Launches the Most Efficient Air Conditioner You Can Buy in America". Carrier. Retrieved Jul. 15, 2020; 9,000 BTU 42 SEER Carrier Single Zone Heat Pump System—230 Volt—High Wall. HVACDirect.com. Retrieved Jul. 15, 2020, each incorporated herein by reference in entirety). During the 2014 AHR Expo, Mitsubishi unveiled a new mini-split ductless AC unit with a SEER rating of 30.5. (Most Energy-efficient Ductless Model on Market Provides Significant Heating Capacity in Extreme Cold Climates". Feb. 4, 2014; incorporated herein by reference) GREE released a 30.5 SEER rating mini split in 2015 as well (see: GREE Crown Mini Split". Mar. 20, 2015; incorporated herein by reference). Traditional AC systems with ducts have maximum SEER ratings slightly below these levels. Also, practically, central systems have an achieved energy efficiency ratio 10-20% lower than the nameplate rating due to the duct-related losses.

Assuming the SEER index of the modern systems to be 30 in the best commercially available embodiments, the COP of such machines is ~8. However, in the inventive scheme of both FIGS. 1 and 5a-c, heat transfer from a colder body (air)

to a warmer body (brine) is accompanied by condensation at both thermal levels. The heat of the condensed moist in the air is passed to water, contributes to water evaporation, and is removed from the solar still film barrier leading to the second condensation. Thus, the equivalent COP is ~16 for the inventive apparatus before considering waste heat (adding to the effective COP).

With 20% utilization of solar energy as electric power and trapping of 80% of the heat in the solar battery, 4 kWh of waste heat are harvested and delivered to the solar still per each one kWh delivered to the compressed coolant. This 4 kWh includes the waste heat of the compressor, fan and pump. The resulting amount of thermal energy contributing to water evaporation and the subsequent distillation is 16+4=20 kWh per 1 kWh of the compressor work. This is a higher estimate than used previously and is likely to indicate the lower cost limit of the inventive process in the absence of integration with the sources of freely available waste heat but without adding much to the capital expenditures.

The levelized costs of the energy consumed in the compressor are in the range 0.52-3.1 EUR/KWh (see: Gupta R, Soini M C, Patel M K, Parra D. Levelized cost of solar photovoltaics and wind supported by storage technologies to supply firm electricity. Journal of Energy Storage. 2020 Feb. 1; 27:101027; incorporated herein by reference in entirety). This numerical range emerges considering the 2:1 ratio between the produced electric power in a solar cell and delivered to the compressor and the 50% fraction delivered by the compressor to the compressed coolant. Also 2:1 ratio exists between the costs of the entire desalination unit and its solar panel component. Thus, the total levelized costs are 8-fold higher than those computed only for the energy transferred by the refrigerant against the thermal gradient.

Considering the equivalent COP of 20, the price range is adjusted to 0.052-0.31 EUR/kWh, where the kWh is the energy equivalent of the latent distillation heat, irrespective of the energy sourcing. For example, the distillation of 1 m3 of water requires $2.3 \times 10^9$ joules of latent heat, or 632.7 kWh. The cost range for the inventive installation is 33-198 EUR/m3 or 6.6-39 EUR/day for a typical consumption rate. The annual cost of desalination per person by the inventive method is 2400-14300 EUR/year. The results indicate that in the absence of integration with other sources of waste heat, the process can be affordable only for large-scale production centers located near the sea (at the rate of ~2400 EUR/person/year before the distribution costs). It is likely that the simple economic analysis presented herein does not take into account the additional losses and inefficiencies, such as the escape of thermal energy with infrared photons without evaporating water, distillate drops falling back to the brine and not sliding to the collecting groove 19, losses of heat and cold in the poorly insulated or poorly designed segments of the cycle, contamination with the saline that requires post-processing etc. A conservative estimate of all losses shifts the production costs to ~7200-42000 EUR/year range.

Example 2: Factors Further Decreasing the Distillate Production Costs

The conventional HVAC systems used as a basis for the production cost estimation (Example 1) operate under the constraints that are decreased in the inventive technology, allowing to lower the production costs. One limitation in the traditional heat pumps is the Carnot efficiency limited by the parameters of human comfort. The final temperature in the residential buildings is in the range 20-25° C. and the relative humidity is 50-60%, while in the outside ambient air the temperature can be in the range between −50° C. to +50°, with the humidity ranging from 5% to 100%. The difference between the ambient and the target temperature decreases the annual COP and the SEER indexes, but the actual decrease is even more significant. The HVAC refrigerant in case of air conditioning (cooling the building and heating the hot environment) needs to be warmer than the ambient air to condense post-compression and needs to be colder post-expansion than the air in the building to evaporate and absorb the undesired heat. These temperature differences are small (5-10° C.) but cannot be reduced further due to limited rates of heat transfer. The attempts to reduce the required driving force are countered by the increase in the costs of heat exchangers and insulation necessary for this objective. Thus, the theoretical (Carnot) COP is limited by the combination of human physiological needs and the sum of heat-transfer driving forces. The observed COP or SEER is even lower, considering the losses of heating and cooling, hydraulic and turbulence losses, pressure and friction losses, waste heat etc.

In the inventive technology, there are fewer such constraints. For example, the water temperature in the evaporation chamber 45 (FIG. 5a-c) can be 60° C. and the ambient air carrying water vapor interacting with the coolant post-expansion can be 55° C. in the zone I of the position 47 (FIG. 5a-c). The temperature of the hot post-compressor refrigerant needs to be >65° C. to effectively condense on a finite surface of a heat-exchanger in the evporative chamber 45. The temperature of the refrigerant leaving the expansion valve in the embodiment of FIG. 5a-c can be as high as 45° to condense the steam at 55° in 47 and become vaporized. Instead of $\Delta T$ at least 45-60° C. observed in the conventional HVAC between the cold and hot environments (residence and street), much lower $\Delta T$ and heat-exchanger sizes are possible in the inventive process, facilitated by high heat-transfer coefficients of the concentrated water vapor-air mixes. The heat-transfer coefficients increase exponentially with the increase in the vapor fraction in the humid air.

The lower working temperature difference in the inventive technology as compared to the conventional HVAC cycles means that higher mass flow of the refrigerant is available post-expansion thus condensing more steam. This conclusion follows the lower refrigerant pressure difference P2-P1 matching the more moderate temperature difference between the heat source and heat sink in the inventive method vs. the conventional HVAC benchmark. Correspondingly, the molar compression work in the equation (4) decreases, thus increasing the transferred mass of the refrigerant in the cycle per the same consumed electric power. The cost economy due to the above-described mechanisms is by a factor of ~2.

Also, the higher position of the working window for the temperature difference as compared to the residential HVAC means that the refrigerants with higher molecular mass are available for the heat cycle. Since molar volumes of gases and compression work do not depend on the molecular mass, but heat capacity increases with molecular mass, more heat is transferred per the same compression work with a heavier coolant.

Other criteria of improved heat carrier are the complexity of chemical structure (many vibrational, torsional and rotational degrees of freedom) and chemical stability, prolonging maintenance-free functioning of the ducts. The compounds that satisfy all requirements are typically perfluorocarbons. The non-limiting examples are Novec 1230 (FK-5-1-12, $C_6F_{12}O$ is a fluorinated ketone with the systematic name 1,1,1,2,2,4,5,5,5-nonafluoro-4-3-pentanone and the structural formula $CF_3CF_2CCF(CF_3)_2$, a fully fluorinated analog of ethyl isopropyl ketone with MW=316 gr/mol and bp=49.16° C.); Perflenapent (INN/USAN; also known as perfluoropentane (PFP) and dodecafluoropentane, with MW=288 gr/mol and bp=28° C.); Perfluorohexane, or tetradecafluorohexane (MW=338 gr/mol and bp=56° C.). These compounds have higher heat capacity per 1 atm of pressure than the benchmark 1,1,1,2-Tetrafluoroethane (also known as norflurane (INN), R-134a, Freon 134a, Forane 134a, Genetron 134a, Florasol 134a, Suva 134a, or HFC-134a; MW=102 gr/mol; bp=−26.3° C.). These comparisons illustrate that shifting the working temperature range from 15-35° C. (normal air conditioning) to 40-80° C. (the inventive process) allows the use of heavier molecules as heat carriers gaining at least 2.5 fold increase in the SEER metric just by this factor. More intense heat exchange and smaller heat-exchange surfaces, as well as lower work of compression due to lower Carnot requirements (considered above), contribute to further reduction of the production costs in the inventive process vs. the estimate based on the best benchmark practice. The factors described in Example 2 thus allow to decrease the cost estimate range from ~$7200-$42000/person/year to ~$1440-$8400/person/year before the distribution expenses, but after factoring in the losses and inefficiencies.

Example 3: Use of Seawater as a Heat Sink Decreases the Production Costs Even Further Many technologies demand the presence of reliable and massive heat sink: nuclear power stations, thermal power stations, refineries, chemical plants, metallurgical plants. These processes generate extraordinary amounts of waste heat that needs to be withdrawn rapidly. In this Example the focus is on the role of water as a coolant in the inventive distillation process.

FIG. 5b (discussed above) shows the scheme of an integrated system building on the embodiment of FIG. 5a and utilizing water as a heat sink. The temperature values provided in FIG. 5b are non-limiting and only illustrate the typical approximate values expected in the inventive system. The amount of distillate per unit cost of equipment differs from the prior cost (as computed in Examples 1 and 2) by the following formula:

$$C2 = [DIST1 + \Delta DIST]/[EC1 + \Delta EC] \quad (9)$$

Where C2 is the new ratio of distillate to the capital expenses, DIST1 is the prior distillate productivity, ΔDIST is the increased distillate productivity related to the capital costs EC1+ΔEC; ΔEC is the increment in the capital costs required to input more thermal energy in the cycle (of the contactors 52 and 53 and extra ducts). C1=DIST1/EC1.

C2<C1 when the additional distillate per the cycle produces tangible increment as compared to the prior state, while the costs of production increase negligibly. For example, the contactor units 52 and 53 in FIGS. 5a, 5b are cheap, robust, corrosion-resistant, experience low amortization and maintenance and result in low levelized expenses ΔEC per 1 m3 of distillate. Thus, the costs of 1 m3 of distillate computed in Example 1 and 2 can be further reduced by the additional heat sink and waste heat supply per cycle. All moist evaporated from the warm brine concentrate cooling from 60° C. to 35° C. in the stages 47 and 52 adds to the productivity of the hybrid system. The additional efficiencies per cycle due to inclusion of waste heat sources in both water and coolant loops as well as the use of natural thermal sinks such as ambient water and air to augment the heat pump cycle are estimated by a factor of 2-3. The same equipment will function in a more intense regime, but without the processes that significantly shorten its lifespan.

The levelized costs per person per year in Example 3 can be estimated in the range $480-$2700 and begin at the lower end compare with the energy costs. The combined costs reach $720 per person/per before distribution, or $2 a day.

In this range these expenses are widely accepted for all social strata in most arid regions, suggesting that the technical solutions to the freshwater crisis in the arid regions are realistic. At these costs of production, the social factors (distribution costs, transportation, the decision to invest in the technology, profit margins, provider competition) and not the technology as such determines the scale of use of the invention.

The invention claimed is:

1. A hybrid system for concurrent production of potable water from atmospheric moisture and seawater, comprising:
    a solar photovoltaic cell connected to a battery which provides electrical power to a compressor and a fan, wherein the compressor is fluidly connected to first, second and third heat exchangers;
    wherein the fan is configured to direct a flow of atmospheric air through the second heat exchanger, said air conveyed in an atmospheric water collector,
    a saline water evaporation chamber configured so that the flow of the atmospheric air after passing through the second heat exchanger cools the walls of the saline water evaporation chamber which is configured to condense water vapor on an outer cooled roof of the saline water evaporation chamber,
    wherein the saline water evaporation chamber contains the first heat exchanger downstream of the compressor and is configured to cool a compressed and hot refrigerant in the first heat-exchanger by passing the compressed and hot refrigerant excess enthalpy to saline water present in the saline water evaporation chamber;
    an expansion device downstream of the first heat exchanger to adiabatically expand and cool the refrigerant and pass an expanded and cooled refrigerant through a first exit and a second exit,
    wherein the expanded and cooled refrigerant from the first exit passes through the second heat exchanger which is in contact with the flow of atmospheric air to condense water vapor from the atmospheric air,
    wherein the expanded and cooled refrigerant from the second exit passes through the third heat exchanger which is in thermal connection with the solar photovoltaic cell and is configured as a heat sink to the solar photovoltaic cell,
    wherein the gaseous refrigerant from the second heat exchanger and the solar photovoltaic cell combine downstream of the second and third heat exchangers into a single gaseous refrigerant feed line to the compressor.

2. The hybrid system of claim 1, wherein the saline evaporation chamber comprises a saline water level sensor connected to a controller, wherein said controller includes program instructions to actuate a pump to supply saline water to the saline evaporation chamber.

3. The hybrid system of claim 1, wherein the saline water evaporation chamber includes a saline water feed line and is configured to concentrate saline water by evaporating freshwater from saline water.

4. The hybrid system of claim 1, wherein the saline water evaporation chamber is topped by a vapor barrier which is transparent to solar radiation in the visible range.

5. The hybrid system of claim 4, further comprising:
a first potable water reservoir hydraulically connected to the saline water evaporation chamber and a second potable water reservoir hydraulically connected to the atmospheric water collector,
wherein each potable water reservoir comprises a potable water level sensor connected to a controller, wherein the controller includes program instructions that turn off the compressor, stop evaporation in the saline water evaporation chamber and simultaneously stops the fan thereby preventing water condensation in both components of the system;
wherein said vapor barrier is a thin film-shaped such that the condensed water vapor slides down along its inner surface under the action of gravity reaching a collection groove at the base of the vapor barrier and flows into the first potable water reservoir either naturally or by the action of a pump.

6. The hybrid system of claim 1, wherein a concentrated waste saline line in the evaporation chamber is fluidly connected to a reverse osmosis module.

7. A hybrid system for concurrent production of desalinated water from atmospheric moisture and seawater, comprising:
a solar photovoltaic cell connected to a battery which provides electrical power to a compressor and a fan, wherein the compressor is fluidly connected to first, second and third heat exchangers;
wherein the fan is configured to direct a flow of atmospheric air through the second heat exchanger, said air conveyed to an atmospheric water collector,
a saline water evaporation chamber configured so that the flow of the atmospheric air after passing through the second heat exchanger cools an outer surface of the roof of the saline water evaporation chamber and is configured to condense water vapor on a cooled roof of the saline water evaporation chamber,
wherein the saline water evaporation chamber contains the first heat exchanger downstream of the compressor and is configured to cool a compressed and hot refrigerant in the first heat-exchanger by passing thermal energy from the compressed and hot refrigerant to saline water present in the saline water evaporation chamber;
an expansion device downstream of the first heat exchanger to adiabatically expand and cool the refrigerant and pass an expanded and cooled refrigerant through a first exit and a second exit,
wherein the expanded and cooled refrigerant from the first exit passes through the second heat exchanger which is in contact with the flow of atmospheric air to condense water vapor from the atmospheric air in the unit,
wherein the expanded and cooled refrigerant from the second exit passes through the third heat exchanger which is in thermal connection with the solar photovoltaic cell and is configured as a heat sink to the solar photovoltaic cell,
wherein the gaseous refrigerant from the second heat exchanger and the solar photovoltaic cell combine downstream of the second and third heat exchangers into a single gaseous refrigerant feed line to the compressor;
wherein dehumidified cooled air after leaving the atmospheric water collector is flown tangentially to a surface of a water vapor barrier film covering the saline evaporation chamber, wherein the tangential flow is provided by installing a rigid sheath in parallel to said water vapor barrier limiting the saline evaporation chamber, wherein the cool dehumidified airflow is in a turbulent regime in the flat space between the water vapor barrier films, wherein the distance between the films is from 1 to 10 cm; and
wherein the fan-driven flow of the dehumidified air attracts a portion of ambient air also acting as a coolant for the evaporation chamber roof.

8. The hybrid system of claim 7, wherein the seawater evaporated in the saline water evaporation chamber first contacts any of the photovoltaic cell, a pump, and the compressor.

9. The hybrid system of claim 7, further comprising:
any of an electric battery, a fuel cell, an electric grid, a power generator, a windmill, a thermal pair, and a reverse electrodialysis module.

\* \* \* \* \*